(12) United States Patent
Maeda

(10) Patent No.: US 8,891,100 B2
(45) Date of Patent: Nov. 18, 2014

(54) IMAGE FORMING APPARATUS

(71) Applicant: KYOCERA Document Solutions Inc., Osaka (JP)

(72) Inventor: Koji Maeda, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 14/182,348

(22) Filed: Feb. 18, 2014

(65) Prior Publication Data

US 2014/0160529 A1   Jun. 12, 2014

Related U.S. Application Data

(62) Division of application No. 13/871,084, filed on Apr. 26, 2013, which is a division of application No.

(Continued)

(30) Foreign Application Priority Data

| Jan. 31, 2005 | (JP) | 2005-023522 |
| Jan. 31, 2005 | (JP) | 2005-024210 |
| Jan. 31, 2005 | (JP) | 2005-024475 |
| Mar. 9, 2005 | (JP) | 2005-065508 |
| Mar. 9, 2005 | (JP) | 2005-065676 |
| Mar. 9, 2005 | (JP) | 2005-065739 |

(51) Int. Cl.
*H04N 1/00* (2006.01)
*G03G 15/00* (2006.01)

(52) U.S. Cl.
CPC ....... *H04N 1/00501* (2013.01); *G03G 15/5016* (2013.01); *H04N 1/00408* (2013.01); *H04N 1/00384* (2013.01); *H04N 2201/0093* (2013.01); *H04N 1/0035* (2013.01); *H04N 2201/0091* (2013.01); *H04N 1/00535* (2013.01); *H04N 1/00496* (2013.01)
USPC ........................... 358/1.13; 358/1.15; 358/296

(58) Field of Classification Search
CPC ............ G03G 15/5016; H04N 1/0035; H04N 1/00496; H04N 1/00535; H04N 2201/0091; H04N 2201/0093
USPC ......................................... 358/1.15, 1.13, 1.1
See application file for complete search history.

(56) References Cited

U.S. PATENT DOCUMENTS

| 6,819,891 | B2 | 11/2004 | Suzuki |
| 7,251,344 | B2 | 7/2007 | Sakata et al. |

(Continued)

FOREIGN PATENT DOCUMENTS

| JP | 62-153871 | 7/1987 |
| JP | 62-153966 | 7/1987 |

(Continued)

OTHER PUBLICATIONS

Japanese Office Action of Jun. 22, 2010.

(Continued)

*Primary Examiner* — King Poon
*Assistant Examiner* — Iriana Cruz
(74) *Attorney, Agent, or Firm* — Gerald E. Hespos; Michael J. Porco; Matthew T. Hespos

(57) ABSTRACT

A clearing section includes a counter for measuring a period up to the reset of contents set by means of an operation panel to initial values. If a position discriminating section discriminates that the operation panel is at a first position, the clearing section starts measuring the period by means of the counter from the first entry made to the operation panel. When a count value reaches a predetermined value, the clearing section executes an automatic clear processing to reset the contents set by means of the operation panel to the initial values. On the other hand, the clearing section cancels the execution of the automatic clear processing if the position discriminating section discriminates that the operation panel is at a second position.

5 Claims, 28 Drawing Sheets

Related U.S. Application Data

11/959,509, filed on Dec. 19, 2007, now Pat. No. 8,437,052, which is a division of application No. 11/341,360, filed on Jan. 26, 2006, now Pat. No. 7,336,911.

(56) References Cited

U.S. PATENT DOCUMENTS

| | | |
|---|---|---|
| 7,268,769 B2 | 9/2007 | Kogoh et al. |
| 2003/0218643 A1* | 11/2003 | Sakata et al. ............ 345/865 |
| 2004/0081479 A1 | 4/2004 | Kobayashi et al. |
| 2004/0131376 A1 | 7/2004 | Hashimoto et al. |
| 2006/0171734 A1 | 8/2006 | Maeda |
| 2008/0130072 A1 | 6/2008 | Maeda |

FOREIGN PATENT DOCUMENTS

| | | |
|---|---|---|
| JP | 5-333988 | 12/1993 |
| JP | 8-146838 | 6/1996 |
| JP | 9-305063 | 11/1997 |
| JP | 11-119498 | 4/1999 |
| JP | 11-160938 | 6/1999 |
| JP | 2000-188651 | 7/2000 |
| JP | 2002-361968 | 12/2002 |
| JP | 2003-94769 | 4/2003 |
| JP | 2003-98908 | 4/2003 |
| JP | 2003-140786 | 5/2003 |
| JP | 2003-316211 | 11/2003 |
| JP | 2003-335033 | 11/2003 |
| JP | 2004-109352 | 4/2004 |
| JP | 2004-256246 | 9/2004 |
| JP | 2004-272136 | 9/2004 |
| JP | 2004-276324 | 10/2004 |
| JP | 2004-287453 | 10/2004 |
| JP | 2004-294700 | 10/2004 |
| JP | 2004-336417 | 11/2004 |
| JP | 2005-17690 | 1/2005 |
| JP | 2006-208956 | 8/2006 |

OTHER PUBLICATIONS

Japanese Office Action of Jul. 6, 2010.
Japanese Office Action of Jul. 13, 2010.
US Office Action of Jun. 25, 2010.
US Office Action of Dec. 8, 2010.
US Office Action of Jun. 28, 2012.
US Election/Restriction Requirement of Apr. 28, 2010.
US Office Action of Aug. 20, 2013.
Notice of Allowance and Notice of Allowability of Nov. 20, 2013.

* cited by examiner

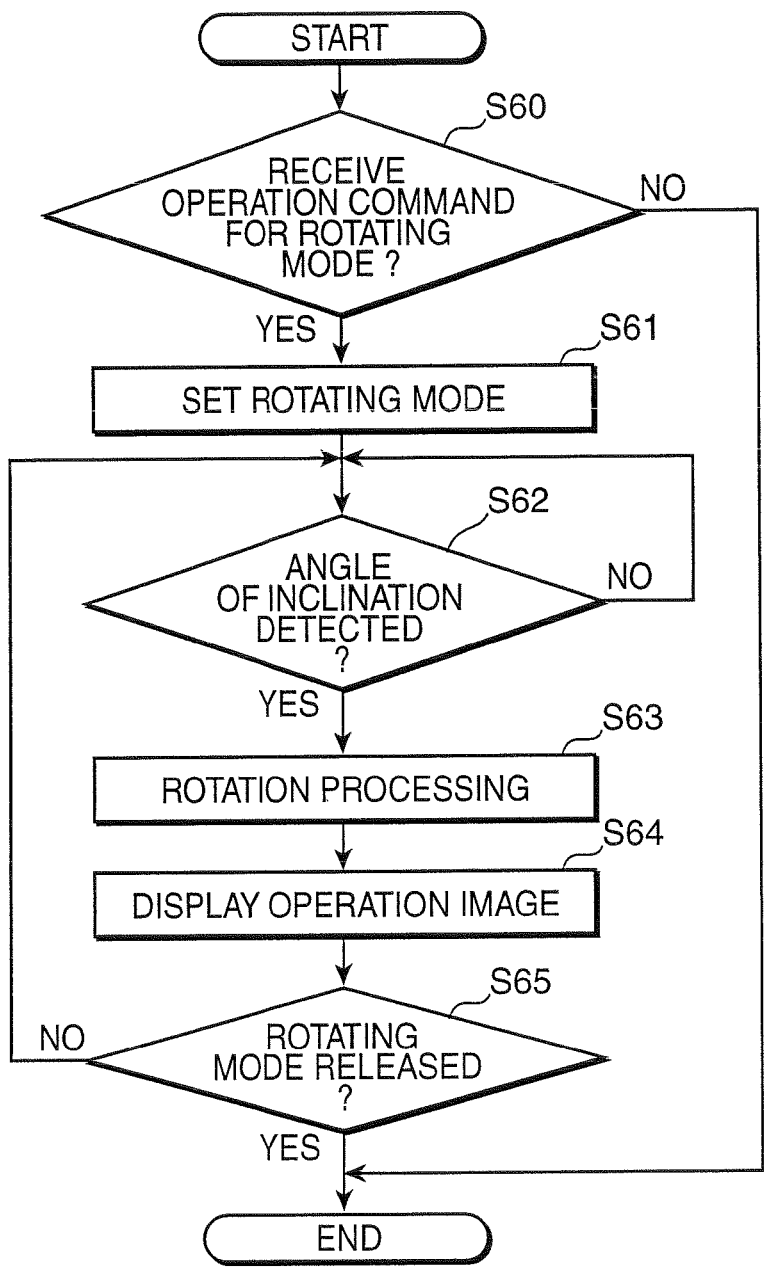

IMAGE FORMING APPARATUS

CROSS-REFERENCE TO RELATED APPLICATIONS

This application is a divisional of U.S. patent application Ser. No. 13/871,084, filed on Apr. 26, 2013, which in turn is a divisional of U.S. patent application Ser. No. 11/959,509, filed on Dec. 19, 2007, which in turn is a divisional of U.S. patent application Ser. No. 11/341,360 filed on Jan. 26, 2006.

BACKGROUND OF THE INVENTION

1. Field of the Invention

The present invention relates to an image forming apparatus.

2. Description of the Related Art

In recent years, it has been about to pay attention to physically handicapped operators in the field of business equipments such as copiers and facsimile apparatuses. One of objects of attention is an input operation unit installed in business equipments. This input operation unit generally has an angle set to a substantially horizontal one for physically normal people who operate while standing. In the case where the input operation unit is provided with a liquid crystal display (LCD) panel, the LCD panel installed in this type of input operation unit has a narrow view angle and illumination light reflects at the outer surface of the panel. Thus, particularly for an operator who operates while being seated in a wheel chair, the visibility of the input operation unit is poor.

In view of the above problems, a technology for the construction of a control panel provided in an image forming apparatus to rotatably mount the control panel on the front surface of the image forming apparatus via a rotary shaft to make an angle of inclination of the control panel changeable has been proposed with a view to improving the operability of the input operation unit for physically handicapped operators, for example, in Japanese Unexamined Patent Publications No. 2004-287453, H11-119498 and H11-160938.

However, the image forming apparatuses disclosed in the above publications are constructed to merely change the angle of inclination of the control panel, and there has been room for further improvement in operability for physically handicapped people.

SUMMARY OF THE INVENTION

In view of the problems residing in the prior art, an object of the present invention is to provide an image forming apparatus having a better operability for physically handicapped people.

In order to accomplish the above object, the invention is directed to an image forming apparatus, comprising an operation display unit mounted on an apparatus main body such that an angle of inclination thereof to horizontal direction is adjustable and adapted to display various operation images; a detecting unit for detecting the angle of inclination of the operation display unit; and a support operation executing unit for executing a specified operation to support a physically handicapped user when the detecting unit detects that the state of the operation display unit has been adjusted from an initial state.

With this construction, the operation display unit is mounted on the apparatus main body such that the angle of inclination thereof to horizontal direction is adjustable. When the detecting unit detects the position of the operation display unit to have been adjusted from the initial state, a specified support function is executed to improve operability for physically handicapped people. In other words, physically handicapped people can execute the support function only by a simple operation of adjusting the angle of inclination of the operation display unit. Therefore, operability for physically handicapped people can be improved.

These and other objects, features, aspects and advantages of the present invention will become more apparent upon a reading of the following detailed description and accompanying drawings.

BRIEF DESCRIPTION OF THE DRAWINGS

FIG. 19 is a flow chart showing the operation of the image forming apparatus according to the fourth embodiment.

FIGS. 20A and 20B are diagrams showing an operation image rotated by a first pattern, wherein FIG. 20A shows a case where an angle of inclination of an operation display unit 300 is 0° and FIG. 20B shows a case where the angle of inclination of the operation display unit is about 20°.

FIGS. 21A and 21B are diagram showing an operation image rotated by a second pattern, wherein FIG. 20A shows a case where an angle of inclination of the operation display unit 300 is 0° and FIG. 20B shows a case where the angle of inclination of the operation display unit is about 90°.

DETAILED DESCRIPTION OF THE PREFERRED EMBODIMENTS

The invention is now described, by way of example, with reference to the accompanying drawings.

Figure 1:
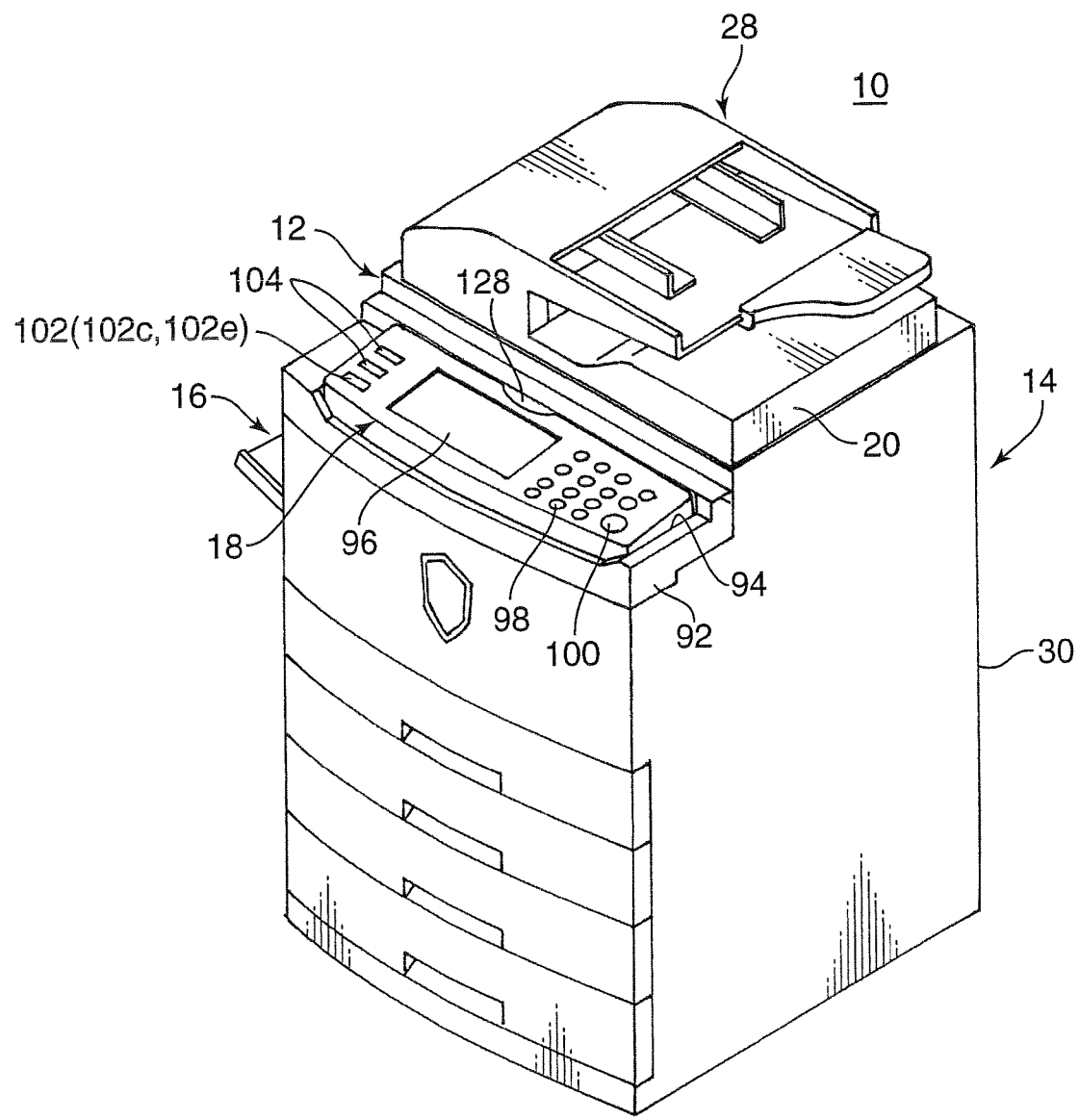
FIG. 1 is a perspective view showing an external construction of an image forming apparatus according to a first embodiment of the invention.

Hereinafter, a first embodiment of an image forming apparatus according to the invention is described with reference to FIGS. 1 and 2. FIG. 1 is a perspective view showing an external construction of an image forming apparatus 10 according to the first embodiment, and FIG. 2 is a side view showing an internal construction of the image forming apparatus 10.

The image forming apparatus 10 is a tandem color copier and is provided with a document reader 12 for reading a document image, a main unit 14 arranged below the document reader 12 for forming the read document image on a recording sheet, a sheet discharging unit 16 which is disposed at a side of the main unit 14 and onto which the recording sheet having the image formed thereon in the main unit 14 is to be discharged, and an operation panel 18 (operation display unit) arranged at a front side of the top end of the main unit 14.

Figure 2:
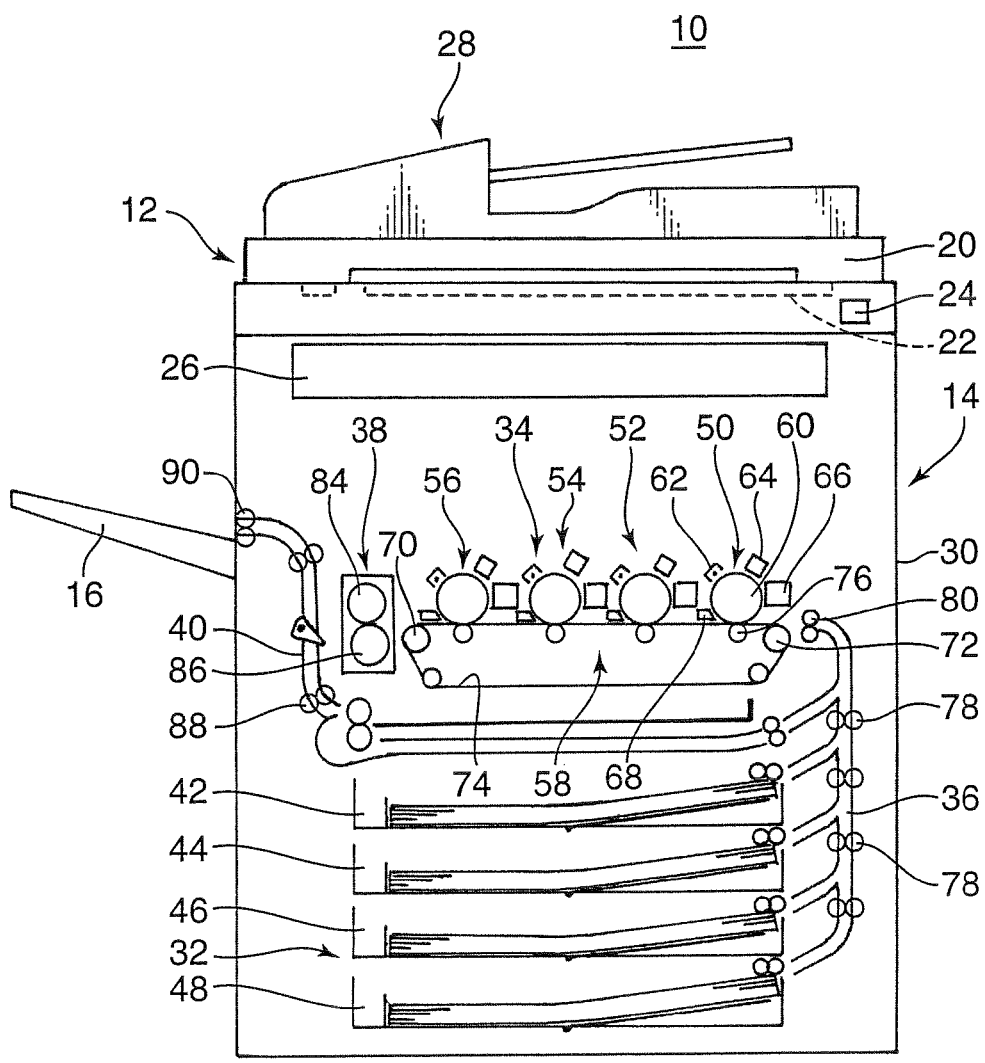
FIG. 2 is a side view showing an internal construction of the image forming apparatus.

As shown in FIG. 2, the document reader 12 includes an openable and closable document pressing portion 20, a contact glass 22 on which a document is to be placed, and an optical system unit 26 having a scanner 24 arranged at a position facing the contact glass 22 at an upper part of the main unit 14 in such a manner as to be movable along the underside of the contact glass 22. An automatic document feeder 28 constructed to be integral to the document pressing portion 20 is arranged above the document pressing portion 20.

The main unit 14 includes a sheet cassette assembly 32 arranged at a bottom part of a casing 30 for accommodating recording sheets, an image forming assembly 34 arranged in the center of the casing 30 for forming an image on a recording sheet based on an image data obtained by the document reader 12, a first conveyance path 36 for conveying a sheet dispensed from the sheet cassette assembly 32 to the image forming assembly 34, a fixing unit 38 for fixing the image formed on the recording sheet in the image forming assembly 34 to the recording sheet, and a second conveyance path 40 for conveying the recording sheet after a fixing processing to the sheet discharging unit 16.

The sheet cassette assembly 32 enables the replenishment of recording sheets by being withdrawn from the casing 30 and includes a plurality of cassettes 42, 44, 46, 48 for accommodating recording sheets of different sizes. Any of the cassettes is selected in correspondence with the document size, and recording sheets contained in the selected cassette are dispensed one by one by a feed roller toward the first conveyance path 36.

The image forming assembly 34 includes a first image forming unit 50 for forming a black toner image, a second image forming unit 52 for forming a cyan toner image, a third image forming unit 54 for forming a magenta toner image, a fourth image forming unit 56 for forming a yellow toner image, and a transferring device 58 for transferring the toner images formed by the respective image forming units 50, 52, 54, 56 to the recording sheet.

Each of the image forming units 50, 52, 54, 56 includes a photosensitive drum 60, a charging device 62 opposed to the outer circumferential surface of the photosensitive drum 60, an exposing device 64 opposed to the outer circumferential surface of the photosensitive drum 60 downstream of the charging device 62, a developing device 66 opposed to the outer circumferential surface of the photosensitive drum 60 downstream of the exposing device 64, and a cleaning device 68 opposed to the outer circumferential surface of the photosensitive drum 60 downstream of the developing device 66. In the developing devices 66 of the respective image forming units, black toner, cyan toner, magenta toner and yellow toner are contained in toner boxes.

The transferring device 58 includes a drive roller 70, a driven roller 72, a transfer belt 74 mounted on the drive roller 70 and the driven roller 72, and four transfer rollers 76 that can be pressed into contact with the photosensitive drums 60 of the respective image forming units at positions downstream of the respective developing devices 66 with the transfer belt 74 therebetween. In this transferring device 58, the recording sheet conveyed from the first conveyance path 36 is electrostatically attached to the transfer belt 74 rotated counterclockwise in FIG. 2 by the drive roller 70 driven by an unillustrated drive motor and conveyed to a downstream side, and the toner images are transferred thereto at the positions of the transfer rollers 76 of the respective image forming units 50, 52, 54, 56.

The first conveyance path 36 is for conveying the recording sheet dispensed from the sheet cassette assembly toward the transferring device 58 and includes a plurality of pairs of conveyance rollers 78 disposed at specified positions, and a pair of registration rollers 80 disposed before the transferring device 58 for adjusting timings of an image forming operation in the image forming assembly 34 and a sheet feeding operation.

It should be noted that an unillustrated registration sensor constructed, for example, by a photointerrupter is provided before the pair of registration rollers 80. When the leading end of the recording sheet is conveyed to such a position as to be held in contact with the registration rollers 80, an electromagnetic clutch is shut off in accordance with an output signal from the registration sensor to stop rotating the pairs of conveyance rollers 78, whereby the conveyance of the recording sheet is temporarily stopped.

The fixing unit 38 is for fixing the toner images transferred to the recording sheet in the image forming assembly 34 to the recording sheet by heating, and includes a fixing roller 84 heated by a built-in heater and a pressure roller 86 disposed to be in pressing contact with the fixing roller 84.

The second conveyance path 40 is for conveying the recording sheet after a fixing processing in the fixing unit 38 to the sheet discharging unit 16, and includes a plurality of pairs of conveyance rollers 88 arranged at specified positions and a pair of discharge rollers 90 arranged at an exit side. The recording sheets having conveyed through the second conveyance path 40 after the fixing processing are successively stacked on the sheet discharging unit 16.

As shown in FIG. 1, the operation panel 18 is so mounted in a recessed space 94 of a frame 92 constituting part of the casing 30 such that the position thereof is selectively changeable to a first position where the operation panel 18 is at a specified angle to a horizontal plane identical with a floor surface (laid state) and a second position where the operation panel 18 is at a larger angle than the first position (raised state at a specified angle).

The operation panel 18 includes a liquid crystal display 96 arranged substantially in the center, a numeric pad 98 arranged adjacent to and at the right side of the liquid crystal display 96, a start button 100 arranged adjacent to and at the right side of the numeric pad 98, and a function button 102 arranged adjacent to and at the left side of the liquid crystal display 96. It should be noted that a construction for making the position of the operation panel 18 selectively changeable between the first position and the second position is described later.

The numerical pad 98 is for setting the number of copiers to be made and the like, and the start button 100 is for instructing the start of a copying operation. Further, the function button 102 is for a mode changeover between a plurality of modes implementable in the image forming apparatus 10.

Figure 3A:
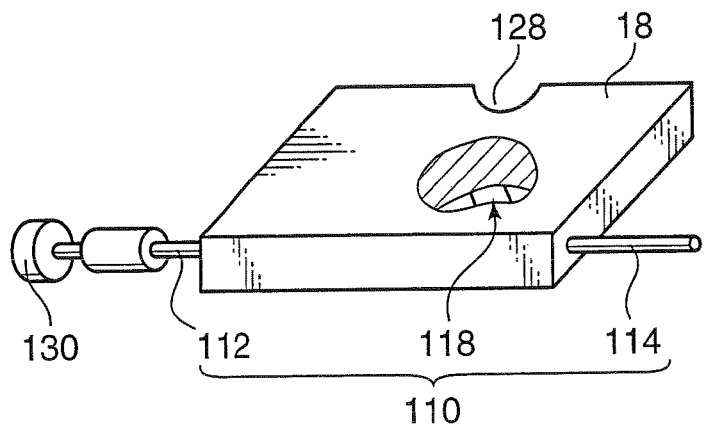
FIGS. 3A to 3C are schematic views showing an exemplary example of an operation-panel supporting unit for enabling an operation panel to be selectively changeable between a first position where the operation panel is laid and a second position where the operation panel is raised at a specified angle.
Figure 3B:
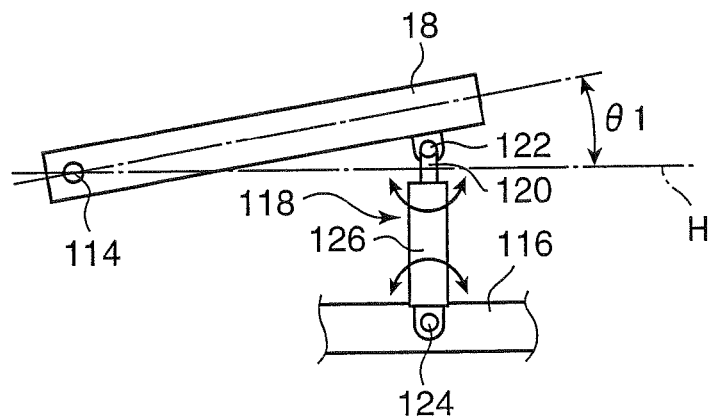
Figure 3C:
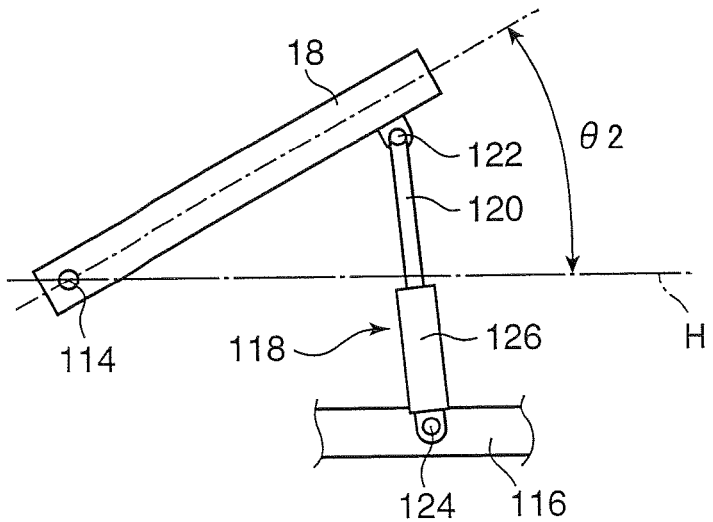

FIGS. 3A to 3C are schematic views showing an exemplary construction of an operation-panel supporting unit for making the position of the operation panel 18 selectively changeable to the first position where the operation panel 18 is laid and to the second position where the operation panel 18 is raised at a specified angle.

An operation-panel driving device 110 is comprised of shafts 112, 114 coaxially extending along transverse direction from the opposite side surfaces of a front end portion of the operation panel 18 and rotatably mounted on the frame 92 (see FIG. 1) constituting part of the casing as shown in FIG. 3A, and an oil damper 118 mounted between the back surface of the operation panel 18 and a supporting frame 116 disposed in the casing 30 as shown in FIGS. 3A to 3C.

The oil damper 118 is constructed such that the leading end of a cylinder 120 is rotatably mounted in directions of arrows about a mounting shaft 122 in parallel with the back surface of the operation panel 18 and the leading end of a tubular member 126 is rotatably mounted in directions of arrows about a mounting shaft 124. The mounting shaft 124 is disposed in parallel with the mounting shaft 122 for the cylinder 120.

The operation panel 18 made rotatable by the operation-panel driving device 110 is rotated between the first position where the operation panel 18 is at an angle θ1 (θ1 may be 0°) to a horizontal plane H identical with the floor surface as shown in FIG. 3B and the second position where the operation panel 18 is at an angle θ2 (θ2>θ1 and θ2 may be 90°) to the horizontal plane H by the action of a specified rotating force as shown in FIG. 3C.

Figure 4:
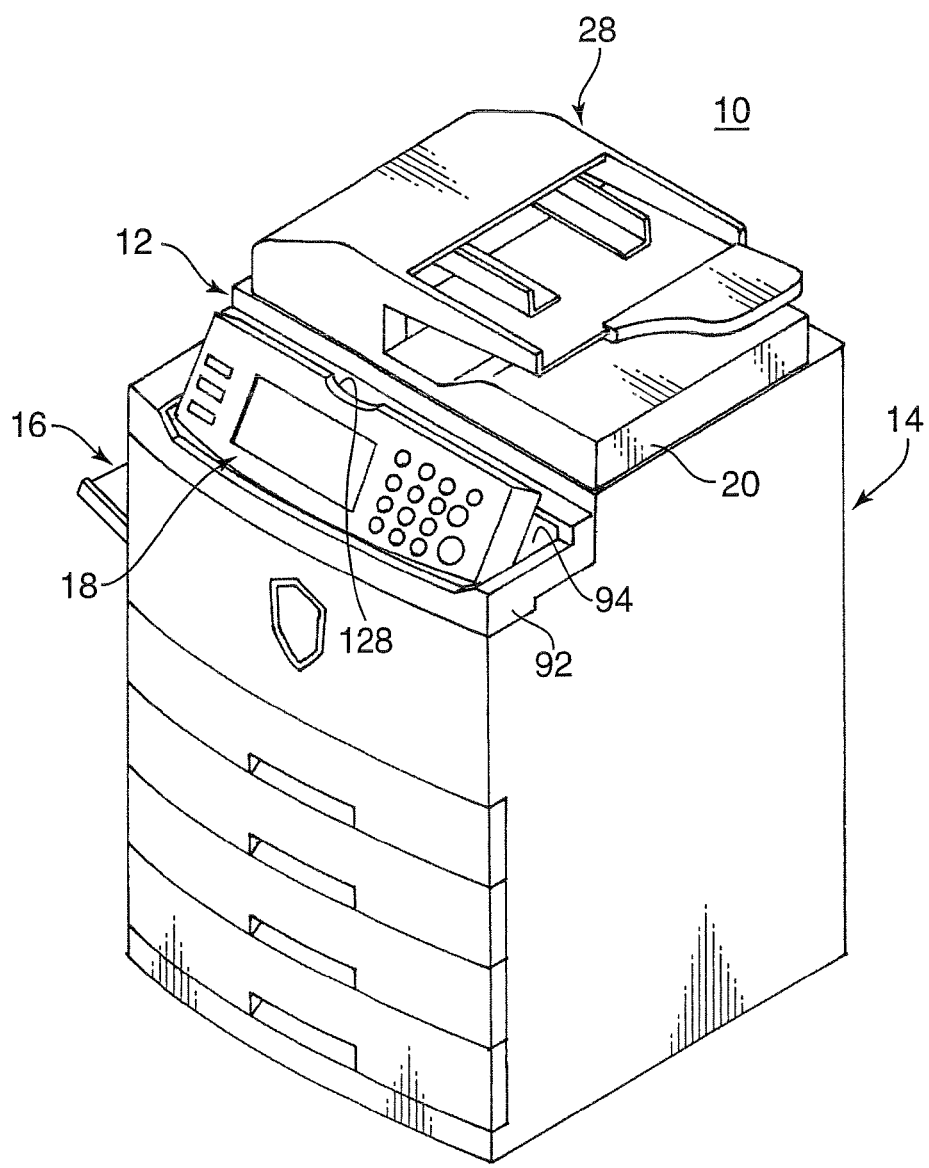
FIG. 4 is a perspective view showing an external construction of the image forming apparatus when the operation panel is at the second position shown in FIG. 3C.

More specifically, the operation panel 18 is made rotatable about the shafts 112, 114 by placing a fingertip at a recess 128 formed in the middle of the rear end of the operation panel 18 to exert a rotating force about the shafts 112, 114. The operation panel 18 is set at the first position shown in FIG. 3B if an operator is a physically normal person while being set at the second position shown in FIG. 3C if the operator is a wheel-chaired person. FIG. 1 shows the image forming apparatus 10 when the operation panel 18 is at the first position shown in FIG. 3B, and FIG. 4 shows the image forming apparatus 10 when the operation panel 18 is at the second position shown in FIG. 3C. It should be noted that the second position shown in FIG. 3C is adjusted according to the sitting height of a wheel-chaired handicapped operator.

An angle sensor 130 for detecting whether or not the operation panel 18 is at the second position is mounted on one shaft 112 of the operation-panel driving device 110. This angle sensor 130 is constructed by a variable resistor such as a potentiometer for detecting a rotation angle of the operation panel 18. A resistance value of the angle sensor 130 changes as the operation panel 18 is rotated, and the rotation angle of the operation panel 18 can be detected based on this changing resistance value.

Figure 5:
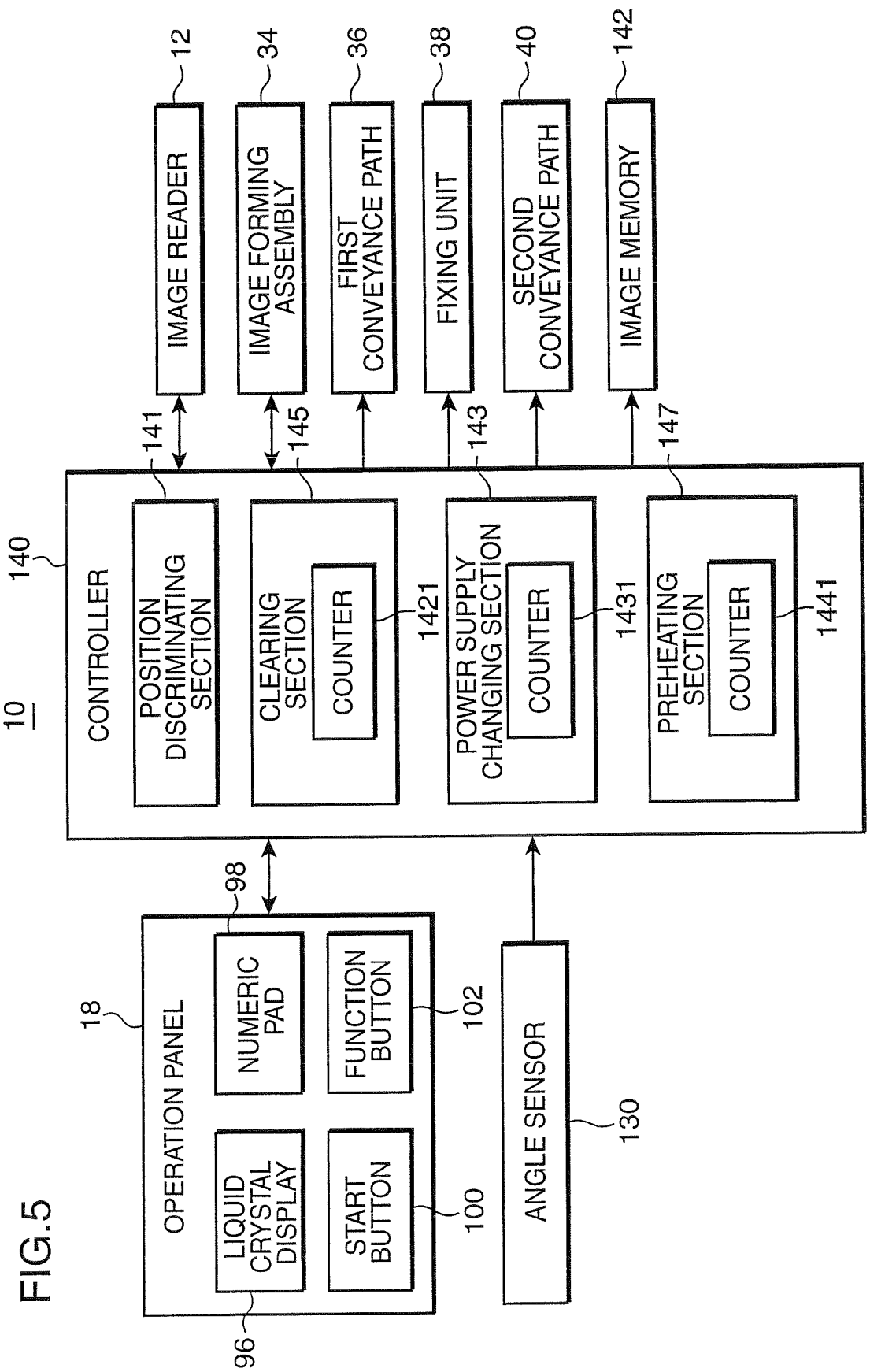
FIG. 5 is a block diagram showing an electrical construction of the image forming apparatus.

FIG. 5 is a block diagram showing an electrical construction of the image forming apparatus 10 of this embodiment. The image forming apparatus 10 is provided with a controller 140 for controlling the image forming operation. The controller 140 is constructed by a microcomputer including a CPU for executing a calculation processing, a ROM storing a processing program, data and the like, and a RAM for temporarily saving data.

The controller 140 also controls operations in the document reader 12, the image forming assembly 34, the first conveyance path 36, the fixing unit 38 and the second conveyance path 40 in accordance with image forming conditions such as the size of recording sheets, the magnification, the density and the number of copies to be made set by means of the operation panel 18.

The controller 140 is connected with an image memory 142 for saving image data read by the document reader 12.

The controller 140 is also functionally provided with a position discriminating section 141, a clearing section 145, a power supply changing section 143 and a preheating section 147. It should be noted that the controller 140 corresponds to a support operation executing unit as claimed.

The position discriminating section 141 discriminates whether the operation panel 18 is at the first position where it is laid or at the second position where it is raised at the specified angle based on the resistance value of the angle sensor 130 that changes according to the rotation angle of the operation panel 18.

More specifically, the position discriminating section 141 discriminates that the operation panel 18 is at the second position, for example, if the resistance value of the angle sensor 130 exceeds a predetermined value while discriminating that the operation panel 18 is at the first position if the resistance value of the angle sensor 130 is equal to or below the predetermined value. Since the second position of the operation panel 18 is adjusted according to the sitting height of a wheel-chaired operator, the resistance value of the angle sensor 130 for discriminating that the operation panel 18 is at the second position is set in view of an angle range of the operation panel 18 to be adjusted. It should be noted that the position discriminating section 141 and the angle sensor 130 correspond to a detecting unit as claimed.

The clearing section 145 executes an automatic clear processing of resetting the content of setting entered by means of the operation panel 18 to an initial value in accordance with the discrimination result of the position discriminating section 141. More specifically, the clearing section 145 includes a counter 1421 for measuring a time, and starts counting by means of the counter 1421 from the point of time when a first entry is made by means of the operation panel 18 if the position discriminating section 141 discriminates that the operation panel 18 is at the first position, and resets the content of setting entered by means of the operation panel 18 to the initial value when a count value reaches a predetermined value.

On the other hand, the clearing section 145 stops executing the automatic clear processing if the position discriminating section 141 discriminates that the operation panel 18 is at the second position.

The power supply changing section 143 executes a transition processing to a sleep mode (hereinafter, "sleep mode transition processing") in which the power supply to a specified mechanism including the operation panel 18 is reduced or shut off in accordance with the discrimination result of the position discriminating section 141. More specifically, the power supply changing section 143 includes a counter 1431 for measuring a time, starts counting (corresponding to time measuring) by means of the counter 1431 from the point of time when a first entry is made by means of the operation panel 18 if the position discriminating section 141 discriminates that the operation panel 18 is at the first position, and executes the sleep mode transition processing when a count value reaches a predetermined value.

On the other hand, the power supply changing section 143 stops executing the sleep mode transition processing if the position discriminating section 141 discriminates that the operation panel 18 is at the second position.

In accordance with the discrimination result of the position discriminating section 141, the preheating section 147 executes a transition processing to a preheating mode in which the power supply to the fixing unit 38 is reduced (hereinafter, "preheating mode transition processing") for a power-saving purpose if no entry is made by means of the operation panel 18 even after the lapse of a predetermined time.

More specifically, the preheating section 147 includes a counter 1441 for measuring a time, starts counting (corresponding to time measuring) by means of the counter 1441 from the point of time when a first entry is made by means of the operation panel 18 if the position discriminating section 141 discriminates that the operation panel 18 is at the first position, and executes the preheating mode transition processing when a count value reaches a predetermined value.

On the other hand, the preheating section 147 stops executing the preheating mode transition processing if the position discriminating section 141 discriminates that the operation panel 18 is at the second position.

Figure 6:
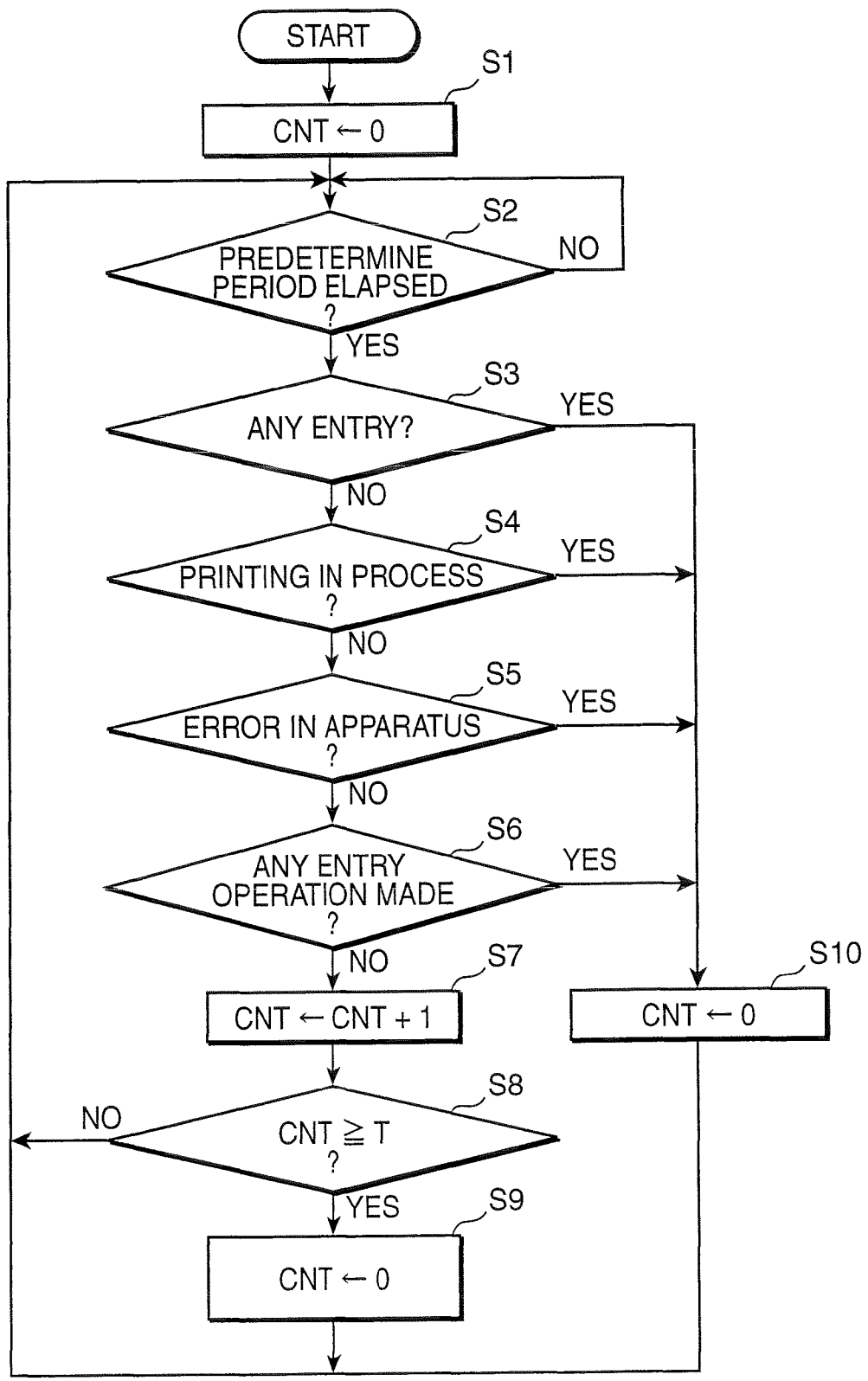
FIG. 6 is a flow chart showing an automatic clear processing.

Next, the automatic clear processing by the controller 140 of the first embodiment is described. FIG. 6 is a flow chart showing the automatic clear processing.

As shown in FIG. 6, the controller 140 clears the count value (written as CNT in FIG. 6) of the counter 1421 (Step S1), and judges whether or not any entry has been to the operation panel 18 (Step S3) after the lapse of a predetermined time (e.g. 250 ms) corresponding to a count value "1" of the counter 1421 (YES in Step S2). If no entry is judged to have been made (NO in Step S3), it is judged whether or not printing is in process and whether or not any error has occurred to the apparatus (Steps S4 and S5).

As a result of judgments, if printing is not in process and if no error has occurred to the apparatus (NO in Steps S4 and S5), the controller 140 judges whether or not the operation panel 18 has been moved from the first position to the second position based on the resistance value of the angle sensor 130 (Step S6).

Unless the operation panel 18 has been moved (NO in Step S6), the count value of the counter 1421 is incremented by "1" (Step S7) and it is judged whether or not the present count value has reached a reference value T (Step S8).

The controller 140 returns to the processing of Step S2 if the present count value is judged not to have reached the reference value T (NO in Step S8) while returning to the processing of Step S2 after clearing the count value and the content of the entry made by means of the operation panel 18 (Step S9) if the present count value is judged to have reached the reference value T (YES in Step S8).

On the other hand, the controller 140 returns to the processing of Step S2 after clearing the count value (Step S10) if any entry has been made by means of the operation panel 18 (YES in Step S3), if printing is in process (YES in Step S4) or if any error has occurred to the image forming apparatus 10 (YES in Step S5).

The controller 140 also returns to the processing of Step S2 after clearing the count value (Step S10) if the operation panel 18 has been moved from the first position to the second position (YES in Step S6). In this way, if the operator is supposed to be a physically handicapped person, the automatic clear processing of resetting the content of the entry made by means of the operation panel 18 to the initial value is not executed.

The preheating mode transition processing and the sleep mode transition processing by the controller 140 of the image forming apparatus 10 of this embodiment may be executed by setting the predetermined time in Step S1, for example, to 1 min. and replacing the processing of "clearing the entered content" in Step S2 by a processing of reducing the power supply to the fixing unit 38 or the processing of reducing or shutting off the power supply to the specified mechanism including the operation panel 18 in the flow chart shown in FIG. 6.

As described above, the automatic clear processing of resetting the content entered by means of the operation panel 18 to the initial value, the preheating mode transition processing or the sleep mode transition processing is not executed if the operation panel 18 has been moved from the first position to the second position. Thus, the entry to the operation panel 18 can be made without any limitation on an entry receiving period if the operator is supposed to be a physically handicapped person. Therefore, the image forming apparatus 10 can be constructed to have a good operability also for physically handicapped people.

In addition to or instead of this embodiment, the present invention may be embodied as described in (1) to (6) below.

In the first embodiment, the executions of the automatic clear processing, the sleep mode transition processing and the preheating mode transition processing are stopped if the operation panel 18 has been moved from the first position to the second position. Instead of stopping these processings, periods up to the automatic clear processing and the other processings may be extended.

Figure 7:
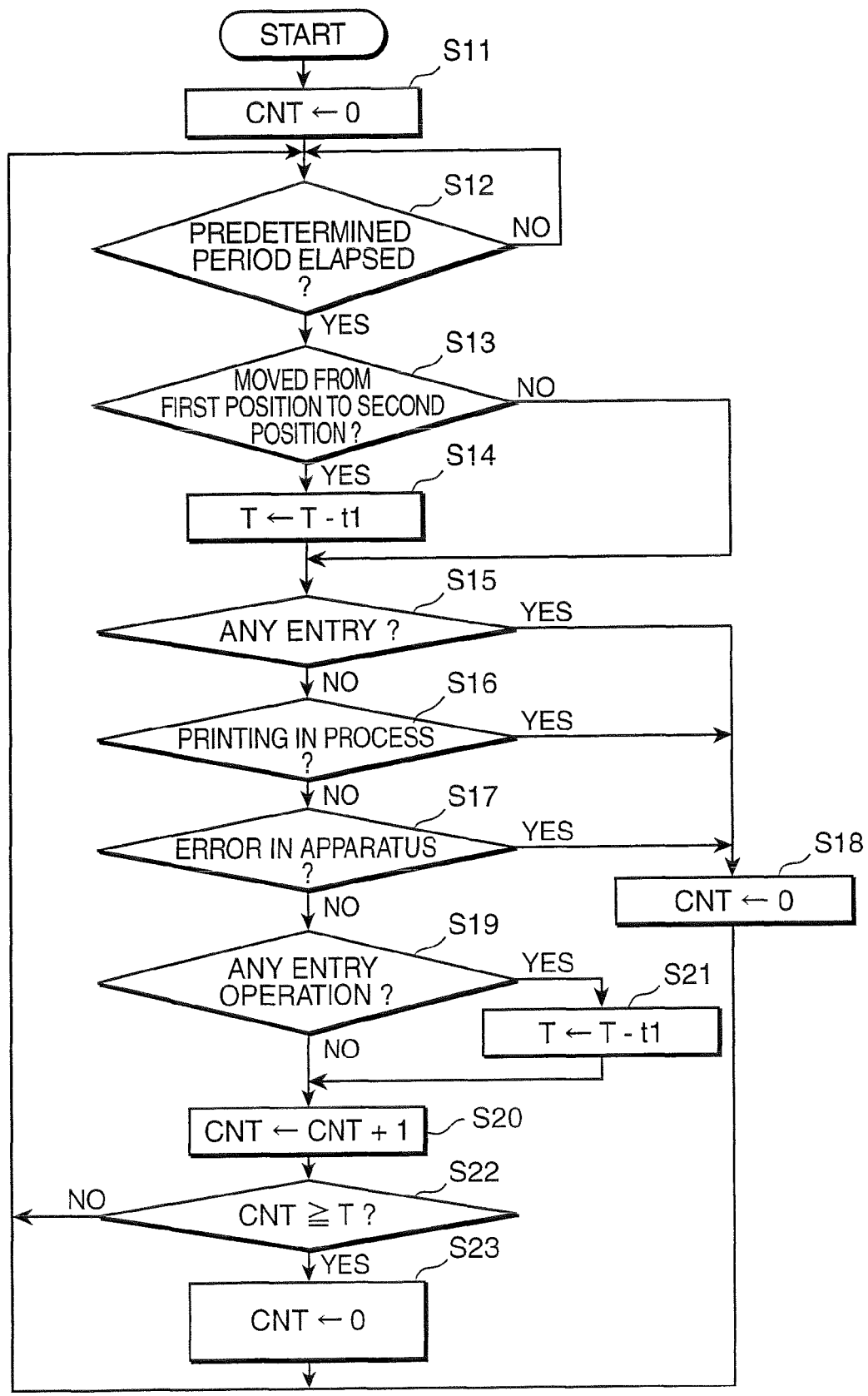
FIG. 7 is a flow chart showing a processing of extending a period up to the automatic clear processing.

FIG. 7 is a flow chart showing a processing of extending the period up to the automatic clear processing. A point of difference of this processing to the processing shown in FIG. 6 is that, instead of the processing in Step S10 of clearing the count value of the counter 1421 if the operation panel 18 has been moved from the first position to the second position in Step S6 of FIG. 6, the reference value T to be compared with the present count value is made larger only by t1 (processing in Step S21) as shown in FIG. 7. This count value t1 is a value corresponding, for example, to three or five min.

Since the extended period needs to be reset to an initial value if the operation panel 18 is returned from the second position to the first position, a processing of "the controller 140 judging based on the resistance value of the angle sensor 130 whether or not the operation panel 18 has been moved from the second position to the first position (Step S13)" and a processing of making the reference value T to be compared with the present count value smaller only by t1 (Step S14)" if the operation panel 18 has been moved (YES in Step S13) are performed between Steps S2 and S3 of FIG. 6. If the operation panel 18 is judged to have not been moved in Step S13 (NO in Step S13), a processing of judging whether or not any entry has been made by means of the operation panel 18 (Step S15)" corresponding to the one in Step S3 of FIG. 6 is performed.

In this way, if the operation panel 18 has been moved from the first position to the second position, the period for receiving the entry by means of the operation panel 18 (entry enabling period) is made longer only by, e.g. three or five min. than in the normal case (case where the operation panel 18 is at the first position). Thus, a possibility of clearing the content entered by means of the operation panel 18 can be reduced if the operator is supposed to be a physically handicapped person, with the result that the image forming apparatus 10 can be constructed to have a good operability for physically handicapped people.

Particularly, since the period for receiving the entry by means of the operation panel 18 is limited in this embodiment, a good operability of the image forming apparatus 10 can be ensured for an operator utilizing the image forming apparatus 10 next to a physically handicapped operator while ensuring a good operability of the image forming apparatus 10 for physically handicapped people.

Specifically, most of operators are thought to conduct a copying operation in an initial state where the image forming conditions such as the size of recording sheets, the magnification, the density and the number of copies to be made are set at predetermined values. Such operators frequently instruct the copying operation assuming that the image forming conditions are set to the initial states. Here, since the automatic clear processing is not executed (the image forming conditions are not reset to the initial states after being changed by means of the operation panel 18) in the first embodiment, a next operator may instruct the copying operation (presses the start button 100) assuming that the image forming conditions are set in their initial states without knowing that they were changed, and may not recognize that the image forming conditions were changed until seeing the recording sheet having an image formed thereon.

Accordingly, as described above, if the operation panel 18 was moved from the first position to the second position, a possibility of the next operator resetting the image forming conditions to the initial states or reinstructing the copying operation due to the above copy failure can be reduced by limiting the period for receiving the entry by means of the operation panel 18 while extending this period. Thus, a good operability of the image forming apparatus 10 can be ensured also for the next operator and the waste of the recording sheets can be suppressed or solved.

The processing to be postponed if the operation panel 18 was moved from the first position to the second position is not limited to the automatic clear processing and may be the aforementioned preheating mode transition processing and/or sleep mode transition processing.

Although the operation-panel driving device 110 for making the position of the operation panel 18 selectively changeable between the first position where the operation panel 18 is substantially laid and the second position where the operation panel 18 is raised at the specified angle includes the shafts 112, 114 and the oil damper 118 in the first embodiment, the present invention is not limited thereto. For example, a snap-switch mechanism may substitute for the oil damper 118. Further, instead of rotating the operation panel 18 about the shafts 112, 114, the operation panel 18 may be slid on a curved pedestal.

Although the position of the operation panel 18 is manually changed by the operator to the first position where the operation panel 18 is substantially laid and the second position where the operation panel 18 is raised at the specified angle in the first embodiment, the present invention is not limited thereto. For example, an operation switch may be disposed in the casing 30 or the like, and the position of the operation panel 18 can be selectively changed to the first position and to the second position by being rotated about the shafts 112, 114 by means of a driving portion of a stepping motor to be driven by turning this operation switch on.

Although whether the operation panel 18 is at the first position or at the second position is detected by the angle sensor 130 in the foregoing embodiment, the present invention is not limited thereto. For example, an optical sensor may be disposed at a position corresponding to the second position of the operation panel 18, and it may be detected by this optical sensor that the operation panel 18 is at the second position. Alternatively, a microswitch or the like may be disposed at a position corresponding to the second position of the operation panel 18 and pushed by the operation panel 18 when the operation panel 18 is at the second position, thereby detecting that the operation panel 18 is at the second position.

The processings whose executions are stopped or postponed if the operation panel 18 has been moved from the first position to the second position are not limited to the automatic clear processing, the preheating mode transition processing and the preheating mode transition processing. If the image forming apparatus 10 is provided with a function of executing such a processing as to prohibit the entry by means of the operation panel 18, the execution of this processing may be stopped or postponed.

The present invention is not limited to the image forming apparatus 10 having the aforementioned construction, and may be applied to a color copier constructed to have only one photosensitive drum, a monochromatic copier for forming a monochromatic image, a composite apparatus having a function as a printer and a function as a facsimile apparatus in addition to the function as the copier or a facsimile apparatus constructed to be installed on the floor surface.

Figure 8:
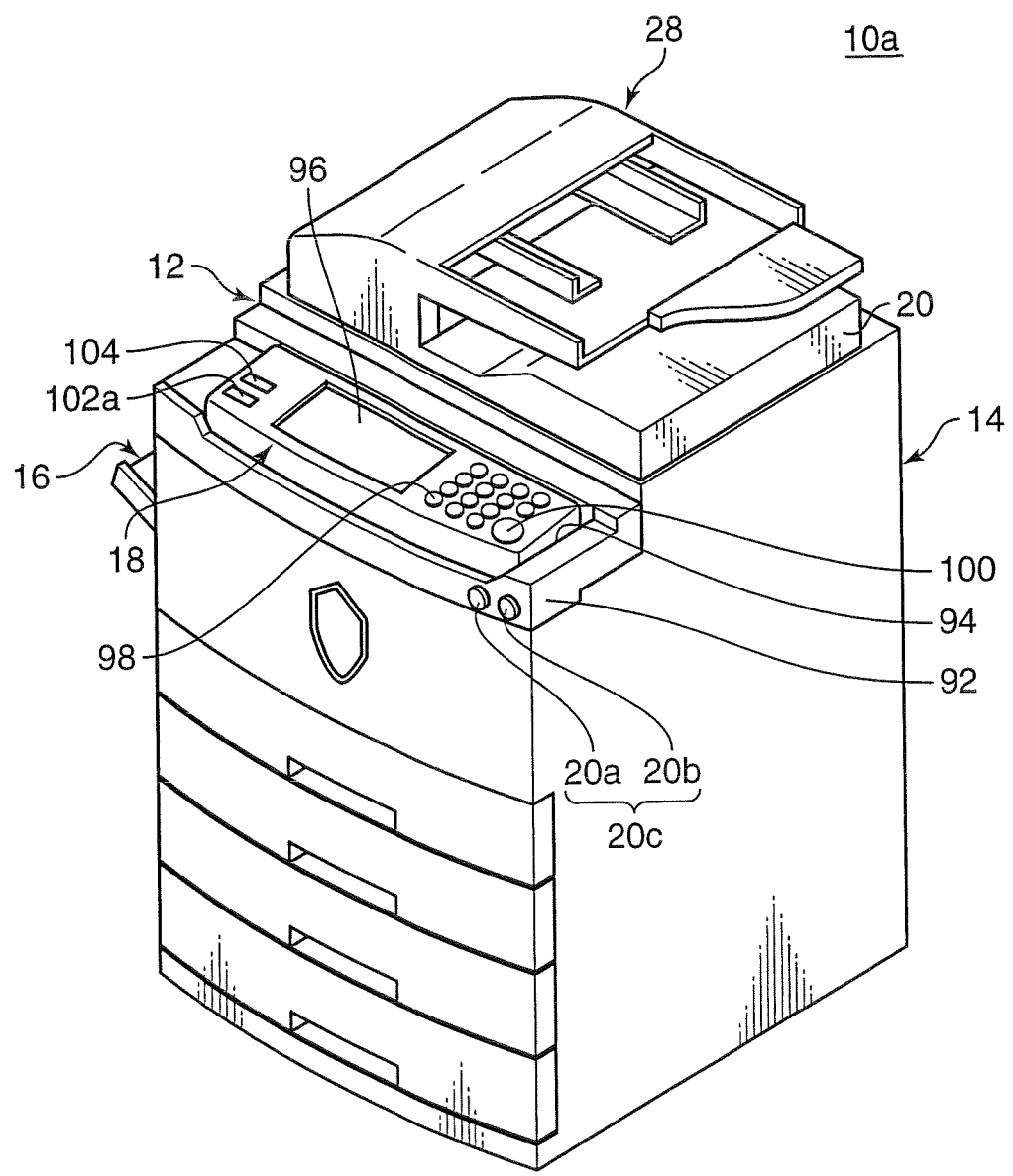
FIG. 8 is a perspective view showing an external construction of an image forming apparatus according to a second embodiment of the invention.

Next, an image forming apparatus 10*a* according to a second embodiment of the present invention is described. FIG. 8 is a perspective diagram schematically showing an external construction of this image forming apparatus. In the second embodiment, elements identical to those of the first embodiment are not described by being identified by the same reference numerals. Further, since the construction of the operation-panel supporting unit of the second embodiment is identical to the one shown in FIG. 3, it is not described here.

The image forming apparatus of the second embodiment is additionally provided with panel drive buttons 20*c* for the operation panel 18 of the image forming apparatus 10 of the first embodiment. The panel drive buttons 20*c* are arranged at positions in the vicinity of an operation panel 18.

Different from the operation panel 18 of the first embodiment, the operation panel 18 of the second embodiment is provided with a function mode selection button 102*a* arranged at the left side of and adjacent to a liquid crystal display 96 and a staying period setting button 104 arranged above and adjacent to the function mode selection button 102*a*.

The panel drive buttons 20c include an activating button 20a and a return button 20b. When the activating button 20a is pressed by an operator, the operation panel automatically moves from the first position to the second position. When the return button 20b is pressed, the operation panel 28 automatically returns from the second position to the first position.

After moving to the second position, the operation panel 18 automatically returns to the first position unless a copying operation (image forming operation) is started before the lapse of a predetermined staying period. Alternatively, the operation panel 18 having moved to the second position automatically returns to the first position after the lapse of a predetermined staying period after the copying operation (image forming operation) is completed. A construction for making the position of the operation panel 18 selectively changeable to the first position and to the second position is described later.

The liquid crystal display 96 is constructed by a touch panel used to set image forming conditions by being touched by fingertips. On the liquid crystal display 96 is displayed an operation image in which a sheet setting portion for setting the kind of recording sheets, etc., a magnification setting portion for setting a copying magnification, a density setting portion for setting a copying density, a sheet processing setting portion for setting stapling, punching or other sheet processing, a function setting portion for setting various functions such as duplex printing or divided printing are successively arrayed.

The image forming conditions on the liquid crystal display 96 are set at initial values determined beforehand for the respective setting portions. For example, "Automatic Sheet Selection" for setting the size of the recording sheet corresponding to a document size is set in the sheet setting portion; "100%" that is identical to the document size is set in the magnification setting portion; and "Automatic Density" for adapting the image density to the density of a document image is set in the density setting portion.

These conditions can be changed to specified input values by touching the respective setting portions, but the input values automatically return to the initial values by an automatic clear processing if the copying operation (image forming operation) is not started despite the lapse of a predetermined period after the conditions were changed to specified input values or if a predetermined period elapses after the copying operation (image forming operation) is completed.

In the present invention, a period up to the execution of this automatic clear processing (a period that elapses after the entry was made to set the specified values if the conditions automatically return to the initial values because the copying operation was not started, or a period that elapses after the completion of the copying operation if the conditions automatically return to the initial values because the copying operation was completed) is called a function realizing period (automatic clearing period).

In the second embodiment, a second period that is a function realizing period when the operation panel 18 is at the second position is set to be longer by a predetermined time than a first period that is a function realizing period when the operation panel 18 is at the first position. Thus, an undesirable situation where the automatic clear processing is executed to reset the input values just set in the operation panel 18 to the initial values before the entry to the operation panel 18 is completed can be effectively avoided. As a result, an operability of the operation panel 18 also for wheel-chaired handicapped people can be improved.

If the operation panel 18 returns from the second position to the first position, the function realizing period that was set to be longer than the first period by the predetermined time is returned to the first period. Therefore, no inconvenience is caused even when a physically normal person operates the operation panel 18.

A numeric pad 98 includes buttons used to set the number of copies to be made and the like, and a start button 100 is for instructing the start of the coping operation. The function mode selection button 102a is for alternatively selecting a first function mode and a second function mode.

Here, in the first function mode, the period up to the execution of the automatic clear processing is set to the specified first period if the operation panel 18 is at the first position, set to the specified second period if the operation panel 18 is at the second position, and returned to the first period if the operation panel 18 returns from the second position to the first position.

In the second function mode, even if the operation panel 18 is at the second position, the automatic clear processing is executed upon the lapse of the first period identical to the one when the operation panel 18 is at the first position.

The staying period setting button 104 is for selectively setting the staying period of the operation panel 18 to one of periods set beforehand. Since the staying period can be changed by operating the staying period setting button 104 in this way, it can be made possible to prevent the operation panel 18 at the second position from automatically returning to the first position before the entry to the operation panel 18 is completed. Therefore, the operability of the operation panel 18 can be improved for wheel-chaired handicapped people.

Figure 9A:
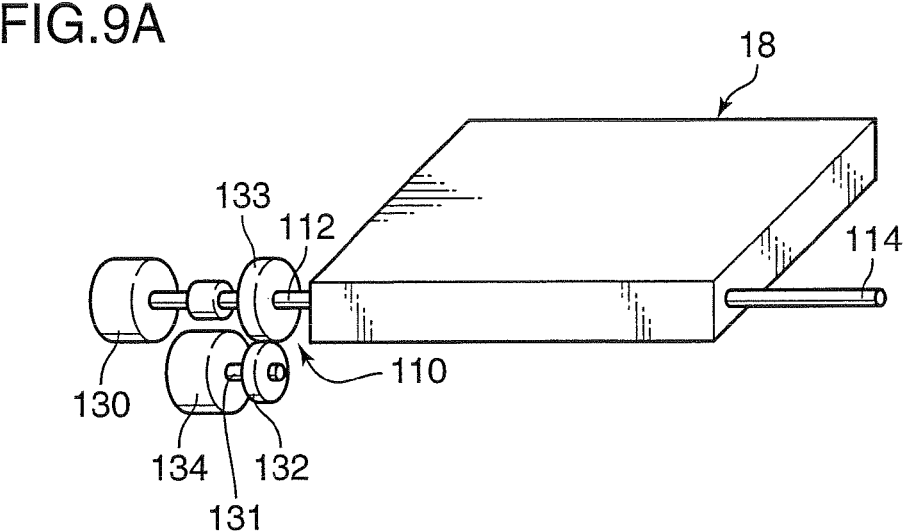
FIGS. 9A to 9C are schematic views showing an exemplary example of an operation-panel driving unit for enabling an operation panel to be selectively changeable between a first position where the operation panel is laid and a second position where the operation panel is raised at a specified angle.
Figure 9B:
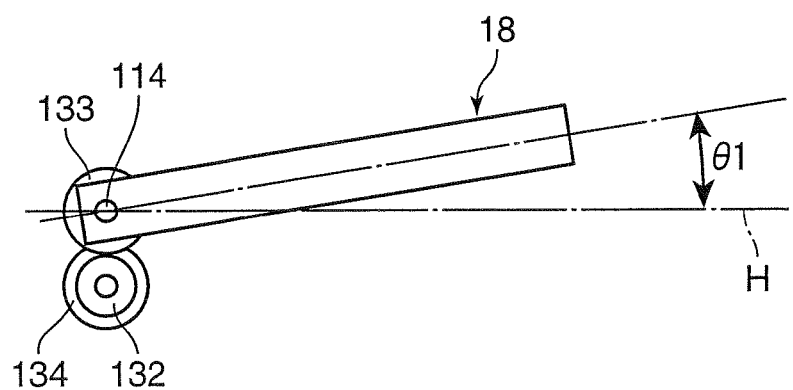
Figure 9C:
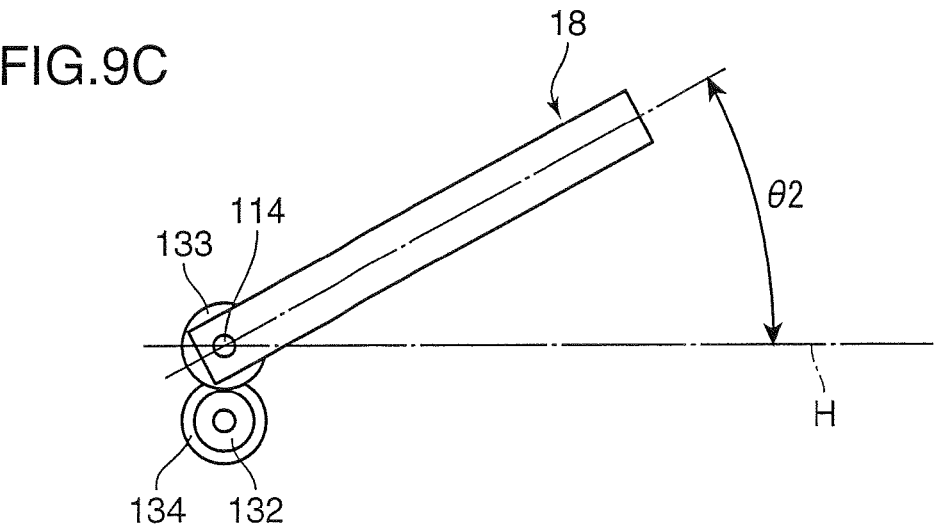

FIGS. 9A to 9C are schematic diagrams showing an construction example of an operation-panel driving device 110 for enabling the position of the operation panel 18 to be selectively changed to the first position where the operation panel 18 is laid and to the second position where the operation panel 18 is raised at a specified angle. As shown in FIGS. 9A to 9C, the operation-panel driving device 110 is comprised of shafts 112, 114 coaxially extending along transverse direction from the opposite side surfaces of a front end portion of the operation panel 18 and rotatably mounted on a frame 92 (see FIG. 8) constituting part of a casing 30, and a drive source 134 including a stepping motor for giving a torque to one shaft 112. The torque of the drive source 134 is transmitted to the shaft 112 by a gear 132 mounted on a rotary drive shaft 131 being engaged with a gear 133 mounted on the shaft 112, whereby the operation panel 18 is made rotatable about the shafts 112, 114.

Specifically, the operation panel 18 is made rotatable between the first position where the operation panel 18 is at an angle θ1 (θ1 may be 0□) to a horizontal plane H identical with the floor surface as shown in FIG. 9B and the second position where the operation panel 18 is at an angle θ2 (θ2>θ1 and θ2 may be 90°) to the horizontal plane H as shown in FIG. 9C by giving the torque to the operation panel 18 from the drive source 134. The operation panel 18 is set at the first position shown in FIG. 9B, which is an initially set position, if the operator is a physically normal person, while being set to the second position shown in FIG. 9C if the operator is a wheel-chaired handicapped person.

Figure 10:
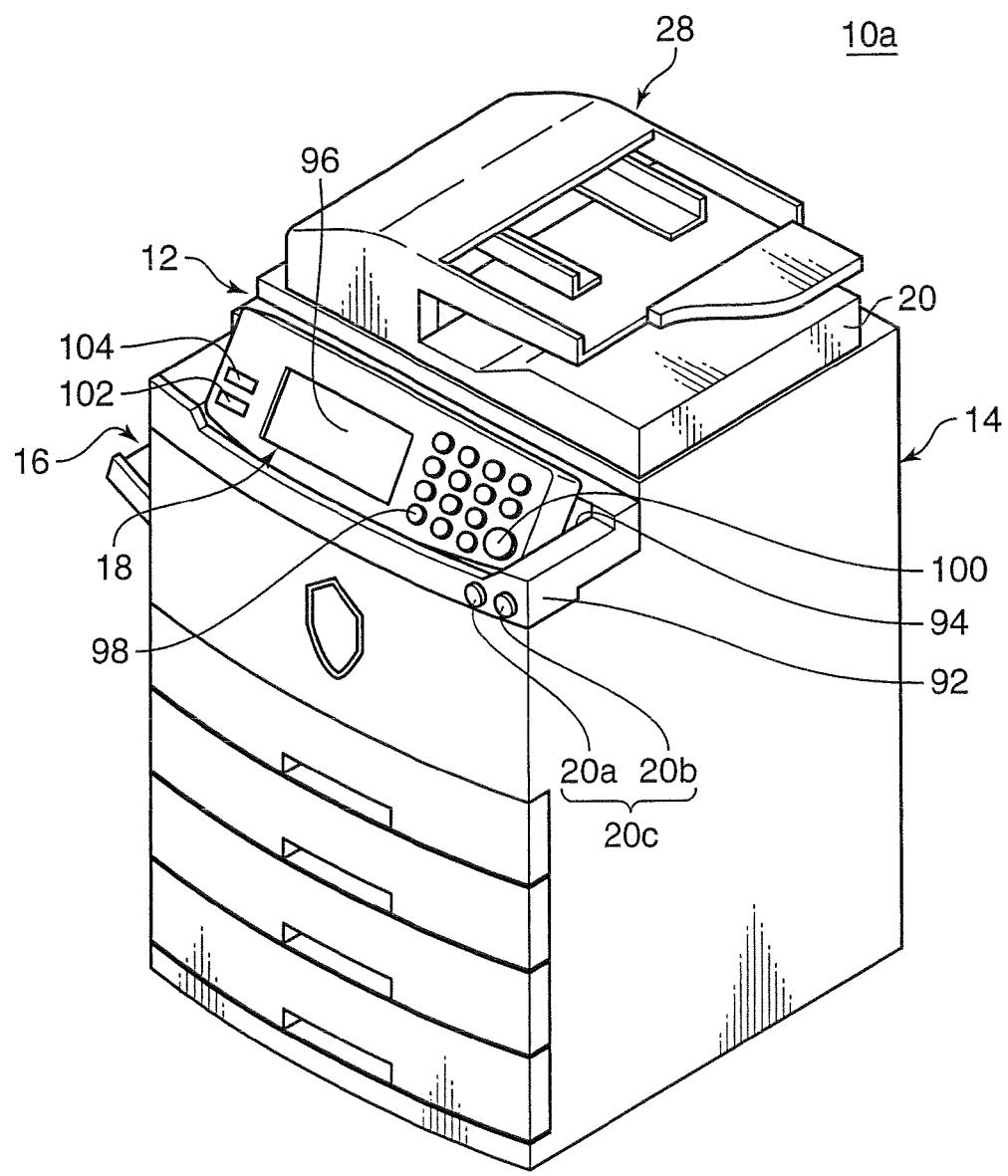
FIG. 10 is a perspective view showing an external construction of the image forming apparatus when the operation panel is at the second position shown in FIG. 9C.

FIG. 8 shows the image forming apparatus 10a when the operation panel 18 is at the first position shown in FIG. 9B, whereas FIG. 10 shows the image forming apparatus 10a when the operation panel 18 is at the second position shown in FIG. 9C. The operation panel 18 is set at the first position shown in FIG. 9B, which is the initially set position, at an initial stage when an unillustrated power switch is turned on, and is set to the second position shown in FIG. 9C by operating the activating button 20*a*. An angle of inclination (angle θ2 of FIG. 9C) of the operation panel 18 at the second position can be adjusted by adjusting an operation period of the activating button 20*a* according to the sitting height of a wheelchaired handicapped person.

An angle sensor 130 constructing a detecting unit for detecting whether the operation panel 18 is at the first position or at the second position is mounted on one shaft 112 of the operation-panel driving device 110. A variable resistor such as a potentiometer for detecting a rotation angle of the operation panel 18 is adopted as this angle sensor 130. As the operation panel 18 is rotated, a rotary shaft of the angle sensor 130 is also rotated, thereby changing a resistance value. Whether the operation panel 18 is at the first position or at the second position is detected based on this changing resistance value.

Figure 11:
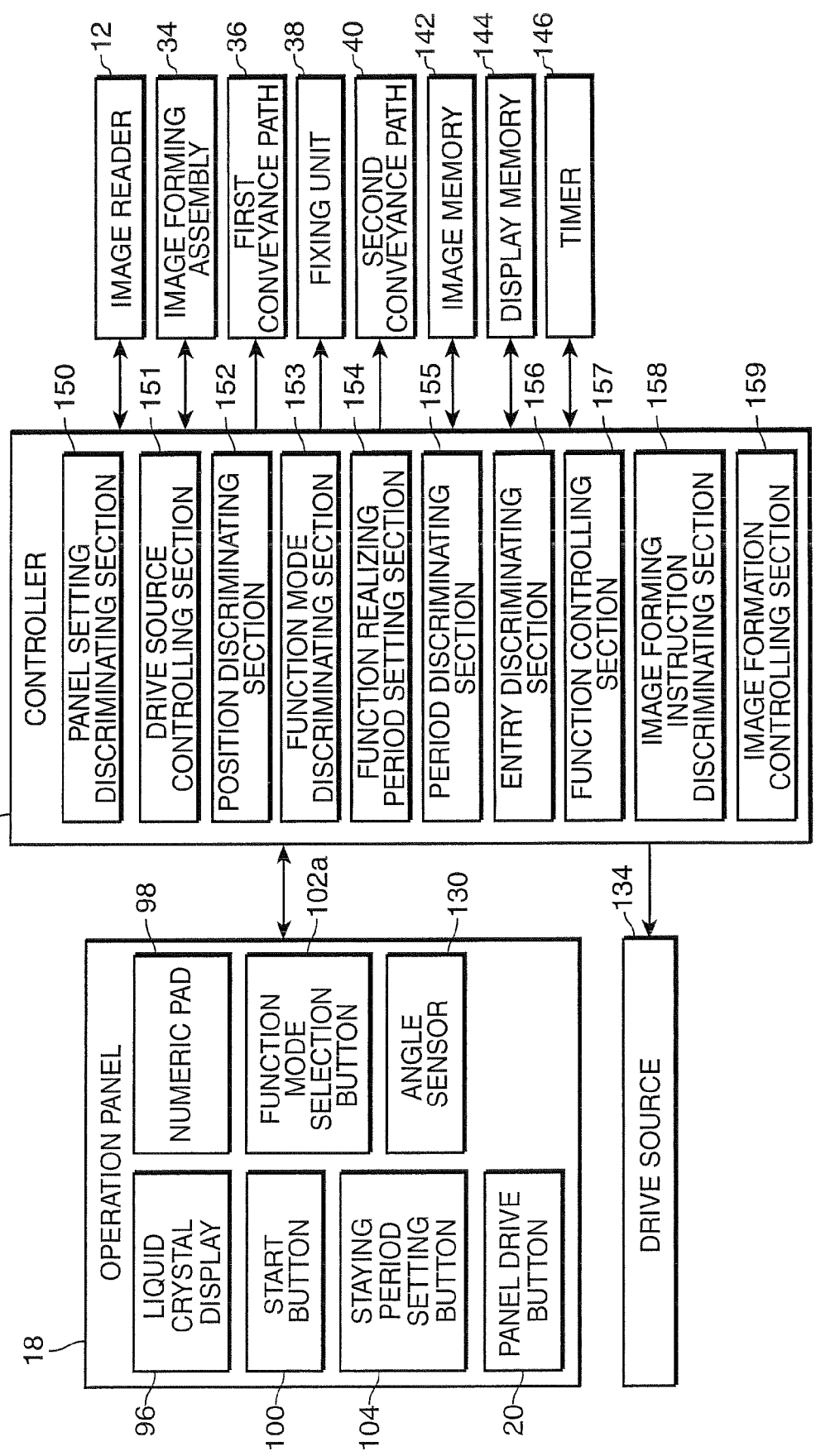
FIG. 11 is a block diagram showing a control construction of the image forming apparatus according to the second embodiment.

FIG. 11 is a block diagram showing an electrical construction of the image forming apparatus 10*a*. The image forming apparatus 10*a* is provided with a controller 140*a* (corresponding to the support operation executing unit) for controlling an image forming operation. The controller 140*a* is constructed by a microcomputer including a CPU for executing a calculation processing, a ROM storing a processing program, data and the like, and a RAM for temporarily saving data; and controls operations in a document reader 12, an image forming assembly 34, a first conveyance path 36, a fixing unit 38 and a second conveyance path 40 in accordance with image forming conditions such as the size of recording sheets, the magnification, the density and the number of copies to be made set by means of the operation panel 18.

The controller 140*a* is connected with the drive source 134 for giving a torque to the operation panel 18, an image memory 142 for saving image data read by the document reader 12, a display memory 144 for saving the content of images to be displayed on the liquid crystal display 96, and a timer 146 for measuring a time.

The controller 140*a* is provided with function realizing sections, i.e. a panel setting discriminating section 150, a drive source controlling section 151, a position discriminating section 152, a function mode discriminating section 153, a function realizing period setting section 154, a period discriminating section 155, an entry discriminating section 156, a function controlling section 157, an image forming instruction discriminating section 158 and an image formation controlling section 159.

The panel setting discriminating section 150 discriminates whether an instruction to set the operation panel 18 at the first position or an instruction to set the operation panel 18 at the second position has been given by operating the panel drive button 20*c*.

The drive source controlling section 151 controls the operation of the drive source 134 for giving the torque to the operation panel 18, and causes the operation panel 18 to move from the first position to the second position when the activating button 20*a* is operated while causing the operation panel 18 at the second position to return to the first position when the return button 20*b* is operated.

The drive source controlling section 151 also causes the operation panel 18 at the second position to return to the first position if no copying operation (image forming operation) has been started despite the lapse of a predetermined period following the movement of the operation panel 18 to the second position or if a predetermined period has elapsed after the copying operation (image forming operation) was completed.

The position discriminating section 152 discriminates whether the operation panel 18 is at the first position where it is laid or at the second position where it is raised at the specified angle based on the resistance value of the angle sensor 130 that changes according to the rotation angle of the operation panel 18.

More specifically, the position discriminating section 152 discriminates that the operation panel 18 is at the second position, for example, if the resistance value of the angle sensor 130 exceeds a predetermined value while discriminating that the operation panel 18 is at the first position if the resistance value of the angle sensor 130 is equal to or below the predetermined value. Since the second position of the operation panel 18 is adjusted according to the sitting height of a wheel-chaired handicapped operator, the resistance value of the angle sensor 130 for discriminating that the operation panel 18 is at the second position is set in view of an angle range of the operation panel 18 to be adjusted.

The function mode discriminating section 153 discriminates whether the first function mode has been selected or the second function mode has been selected.

The function realizing period setting section 154 changes a function realizing period (automatic clearing period) up to the execution of an automatic clear processing from the first period to the second period if the operation panel 18 is at the second position when a first function mode is set. The function realizing period setting section 154 also returns the function realizing period from the second period to the first period when the operation panel 18 returns from the second position to the first position.

The period discriminating section 155 discriminates whether or not the copying operation (image forming operation) has been performed until the function realizing period set by the function realizing period setting section 154 elapses after an input value different from an initial value was entered by means of the operation panel 18. The period discriminating section 155 also discriminates whether the copying operation (image forming operation) has been performed until the function realizing period set by the function realizing period setting section 154 elapses after the copying operation (image forming operation) was completed. For example, a state where the start button 100 is not operated falls under a state where the copying operation is not performed.

By measuring a time by means of the timer 146, the period discriminating portion 155 also discriminates whether or not the staying period of the operation panel 18 at the second position in the case of causing the operation panel 18 to automatically return from the second position to the first position has exceeded a value set by operating the staying period setting button 104.

The entry discriminating section 156 discriminates whether or not a specified input value has been entered by means of the operation panel 18. A discrimination as to this entry can be made, for example, in accordance with an input signal generated when the entry is made.

The function controlling section 157 executes the automatic clear processing. Specifically, the input value in the operation panel 18 is automatically returned to the initial value if the function realizing period has elapsed without performing any copying operation (image forming operation) after an input value different from the initial value was set by means of the operation panel 18 or if the function realizing period has elapsed after the copying operation (image forming operation) was completed.

The image forming instruction discriminating section 158 discriminates whether or not any instruction has been made to form an image on a recording sheet by discriminating whether or not the start button 100 has been operated.

The image formation controlling section 159 forms an image on a recording sheet based on an image data saved in the image memory 142 by causing the image forming assembly 34 and the like to operate.

Figure 12:
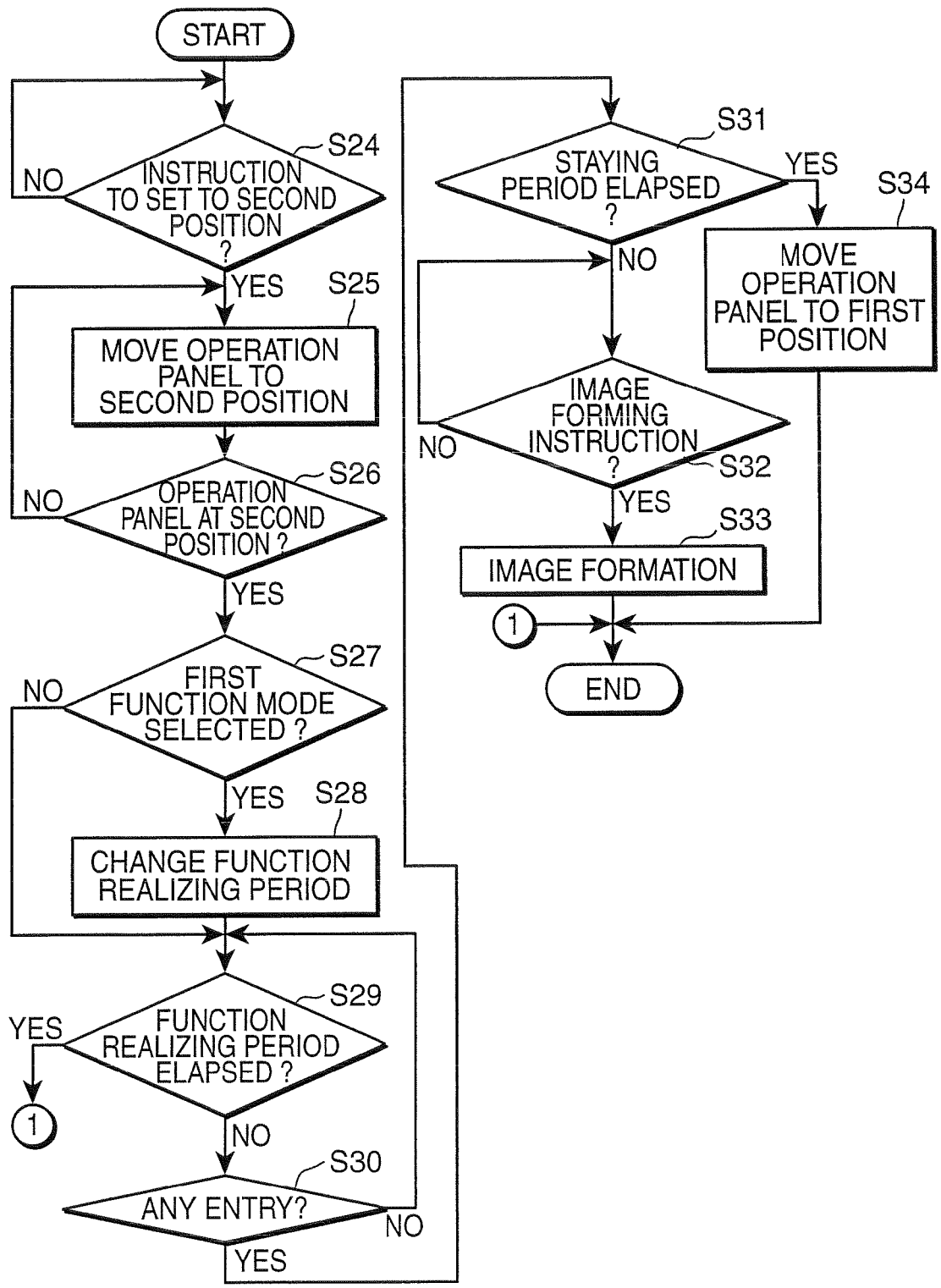
FIG. 12 is a flow chat showing an exemplary first operation in the case of forming an image on a recording sheet in the image forming apparatus of the second embodiment.

FIG. 12 is a flow chart showing an exemplary first operation when an image is formed on a recording sheet in the image forming apparatus 10a. In this exemplary operation, the copying operation (image forming operation) is performed by setting an input value different from the initial value after the operation panel 18 at the first position is moved to the second position.

First, the panel setting discriminating section 150 discriminates whether or not any instruction has been given to set the operation panel 18 at the second position by operating the activating button 20a (Step S24). If the discrimination result in Step S24 is positive, the drive source controlling section 151 controls the drive source 134 to move the operation panel 18 from the first position to the second position (Step S25).

Subsequently, the position discriminating section 152 discriminates whether or not the operation panel 18 is at the second position (Step S26). If the discrimination result in Step S26 is positive, the function mode discriminating section 153 discriminates whether or not the first function mode has been selected by operating the function mode selection button 102a (Step S27).

If the discrimination result in Step S27 is positive, the function realizing period setting section 154 changes the function realizing period up to the execution of the automatic clear processing with the operation panel 18 located at the second position from the first period to the second period (Step S28).

Subsequently, the period discriminating section 155 discriminates whether or not the time counted by the timer 146 after the movement of the operation panel 18 to the second position has exceeded the function realizing period set in Step S28 (Step S29). If the discrimination result in Step S29 is negative, the entry discriminating section 156 discriminates whether or not any entry has been made by means of the operation panel 18 (Step S30). If the discrimination result in Step S30 is positive, the period discriminating section 155 discriminated whether or not the staying period of the operation panel 18 at the second period has elapsed (Step S31).

If the discrimination result in Step S31 is negative, the image forming instruction discriminating section 158 discriminates whether or not an image forming instruction has been given (Step S32). If the discrimination result in Step S32 is positive, the image formation controlling section 159 controls the image forming assembly 34 and the like to form an image on a recording sheet (Step S33).

If the discrimination result in Step S24 is negative, this routine waits on standby until the discrimination result becomes positive. If the discrimination result in Step S26 is negative, this routine returns to Step S25. If the discrimination result in Step S27 is negative, this routine proceeds to Step S29. If the discrimination result in Step S29 is positive, the automatic clear processing is executed to reset the input value entered in the operation panel 18 to the initial value. Therefore, the image forming operation is ended because an initial purpose cannot be fulfilled.

If the discrimination result in Step S30 is negative, this routine returns to Step S29. If the discrimination result in Step S31 is positive, the operation panel 18 automatically returns to the first position (Step S34). In this case, the image forming operation is ended because an initial purpose cannot be fulfilled. If the discrimination result in Step S32 is negative, this routine waits on standby until the discrimination result becomes positive.

Figure 13:
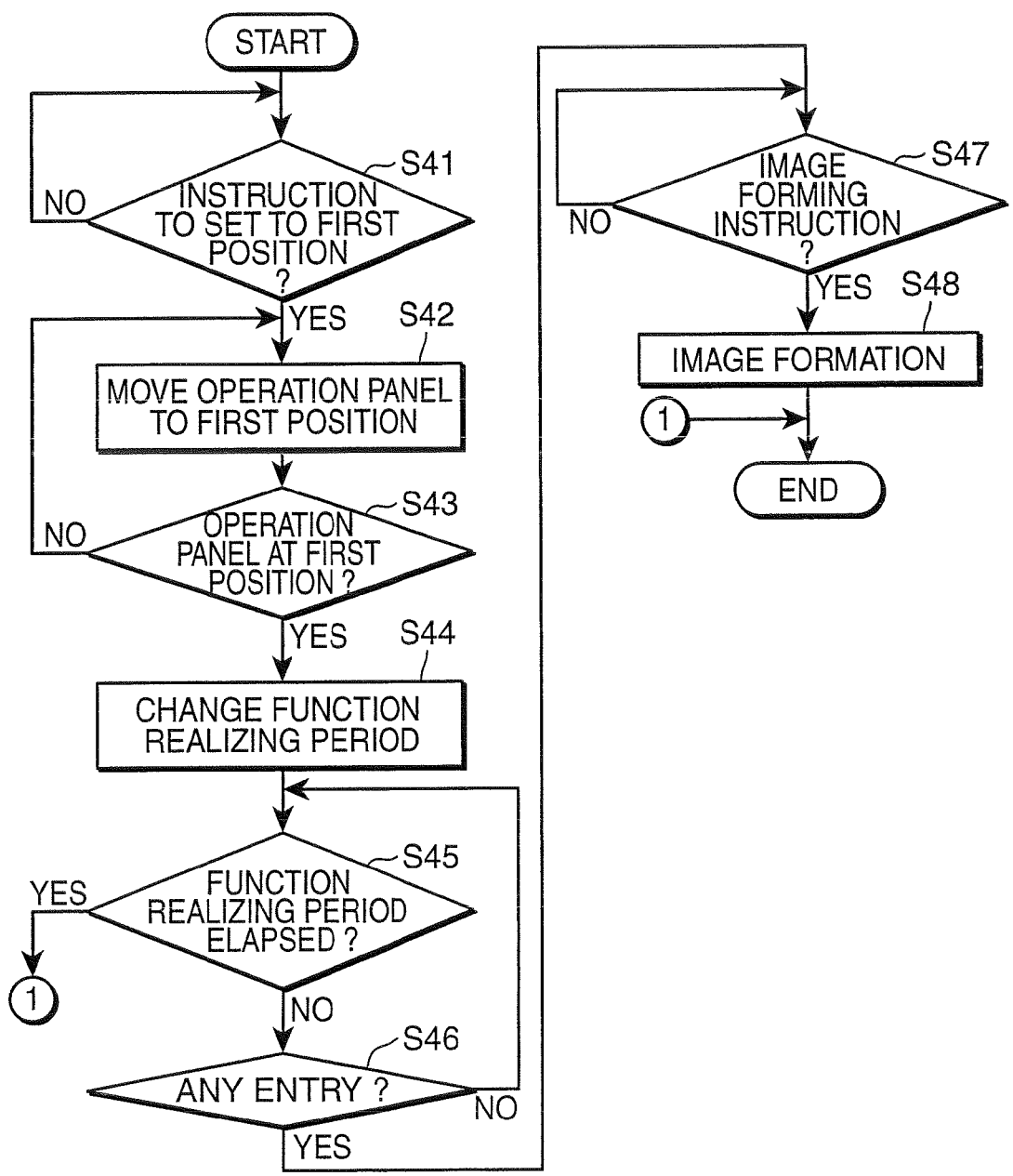
FIG. 13 is a flow chat showing an exemplary second operation in the case of forming an image on a recording sheet in the image forming apparatus of the second embodiment.

FIG. 13 is a flow chart showing an exemplary second operation when an image is formed on a recording sheet in the image forming apparatus 10a. In this exemplary operation, the copying operation (image forming operation) is performed by entering an input value different from the initial value after the operation panel 18 at the second position is moved to the first position.

First, the panel setting discriminating section 150 discriminates whether or not any instruction has been given to move the operation panel 18 at the second position to the first position by operating the return button 20b (Step S41). If the discrimination result in Step S41 is positive, the drive source controlling section 151 controls the drive source 134 to move the operation panel 18 from the second position to the first position (Step S42).

Subsequently, the position discriminating section 152 discriminates whether or not the operation panel 18 is at the first position (Step S43). If the discrimination result in Step S43 is positive, the function realizing period up to the execution of the automatic clear processing is changed (returned) to the first period that is the function realizing period in the case where the operation panel 18 is at the first position (Step S44).

Subsequently, the period discriminating section 155 discriminates whether or not the time counted by the timer 146 after the movement of the operation panel 18 to the first position has exceeded the function realizing period changed in Step S44 (Step S45). If the discrimination result in Step S45 is positive, the entry discriminating section 156 discriminates whether or not any entry has been made to the operation panel 18 (Step S46).

If the discrimination result in Step S46 is positive, the image forming instruction discriminating section 158 discriminates whether or not an image forming instruction has been given (Step S47). If the discrimination result in Step S47 is positive, the image formation controlling section 159 controls the image forming assembly 34 and the like to form an image on a recording sheet (Step S48).

If the discrimination result in Step S41 is negative, this routine waits on standby until the discrimination result becomes positive. If the discrimination result in Step S43 is negative, this routine returns to Step S42. If the discrimination result in Step S45 is positive, the automatic clear processing is executed to reset the input value entered in the operation panel 18 to the initial value. Thus, the image forming operation is ended because the initial purpose cannot be fulfilled. This routine returns to Step S45 if the discrimination result in Step S46 is negative while waiting on standby until the discrimination result becomes positive if the discrimination result in Step S47 is negative.

The image forming apparatus 10a of the second embodiment is constructed as above and, if the operation panel 18 is at the second position, the automatic clear processing is executed upon the lapse of the second period longer than the first period adopted when the operation panel 18 is at the first position. Thus, an undesirable situation where the input value just set in the operation panel 18 returns to the initial value due to the execution of the automatic clear processing before the entry to the operation panel 18 is completed can be effectively avoided, wherefore the operation of the operation panel 18 can be improved also for wheel-chaired handicapped people. Further, if the operation panel 18 returns from the second position to the first position, the period up to the execution of the automatic clear processing is reset to the first period, wherefore no inconvenience is caused, either, when a physically normal person operates the operation panel 18. As a result, the visibility and operability of the operation panel are good for physically handicapped people as well as for physically normal people.

The present invention is not limited to the second embodiment, and may be embodied in various manners, for example, as described below, if necessary.

Although the operation-panel driving device 110 is comprised of the shafts 112, 114 and the drive source 134 including the stepping motor in the second embodiment, the present invention is not limited thereto. Instead of the stepping motor, a solenoid or another means may be, for example, used as the drive source 134. The operation-panel driving device 110 may be manually activated and can be realized by the shafts 112, 114 and an oil damper disposed on the back surface of the operation panel 18. Further, instead of rotating the operation panel 18 about the shafts 112, 114, the operation panel 18 may be slid on a curved pedestal.

Although whether the operation panel 18 is at the first position or at the second position is detected by the angle sensor 130 in the second embodiment, the present invention is not limited thereto. For example, optical sensors may be disposed at positions corresponding to the first position and the second position of the operation panel 18, and whether the operation panel 18 is at the first position or at the second position may be detected by these optical sensors. Alternatively, microswitches or the like may be disposed at positions corresponding to the first position and the second position of the operation panel 18, and whether the operation panel 18 is at the first position or at the second position may be detected by the microswitch being pressed by the operation panel 18.

Although the automatic clear processing is described as an associated processing relating to the image formation in the second embodiment, the present invention is not limited thereto. For example, a sleep processing for turning the power supply off except the one for the operation system and the like to save power upon the lapse of a predetermined period following the completion of the copying operation (image forming apparatus) may be adopted as an associated processing. Alternatively, a preheating processing for reducing the temperatures of heat sources such as the fixing unit to save power upon the lapse of a predetermined period after the completion of the copying operation (image forming apparatus) may be adopted as an associated processing.

Even if the associated processing relating to the image formation is a processing other than the automatic clear processing such as the sleep processing or the preheating processing, an occurrence of such a situation as to make the entry invalid such as the return of the input value just set to the initial value due to the malfunction of the operation panel 18 can be prevented.

Although the function realizing period up to the execution of the automatic clear processing is longer when the operation panel 18 is at the second position than when the operation panel 18 is at the first position in the second embodiment, the present invention is not limited thereto. For example, the automatic clear processing may be not executed when the operation panel 18 is at the second position. This can be made possible by controlling a display driving section for the liquid crystal display 96.

In the second embodiment, the operation panel 18 is returned from the second position to the first position if the image forming operation has not been started until the staying period elapses after the movement of the operation panel 18 to the second position or if the staying period has elapsed after the completion of the image forming operation. However, the present invention is not limited thereto. For example, the operation panel 18 may not be automatically returned from the second position to the first position even if the image forming operation has not been started until the staying period elapses after the movement of the operation panel 18 to the second position or if the staying period has elapsed after the completion of the image forming operation. In such a case, the staying period setting button 104 is not necessary. Further, although the staying period can be changed by operating the staying period setting button 104 in the second embodiment, it may be a fixed value.

Although the first function mode or the second function mode is selected by operating the function mode selection button 102*a* in the second embodiment, the present invention is not limited thereto. For example, the first function mode may be constantly set. In such a case, the function mode selection button 102*a* is not necessary.

Although the function realizing period up to the execution of the automatic clear processing or the like associated processing relating to the image formation is changed after detecting that the operation panel 18 is at the second position in the second embodiment, the present invention is not limited thereto. For example, the function realizing period may be changed by operating the panel drive button 20*c*.

Figure 14:
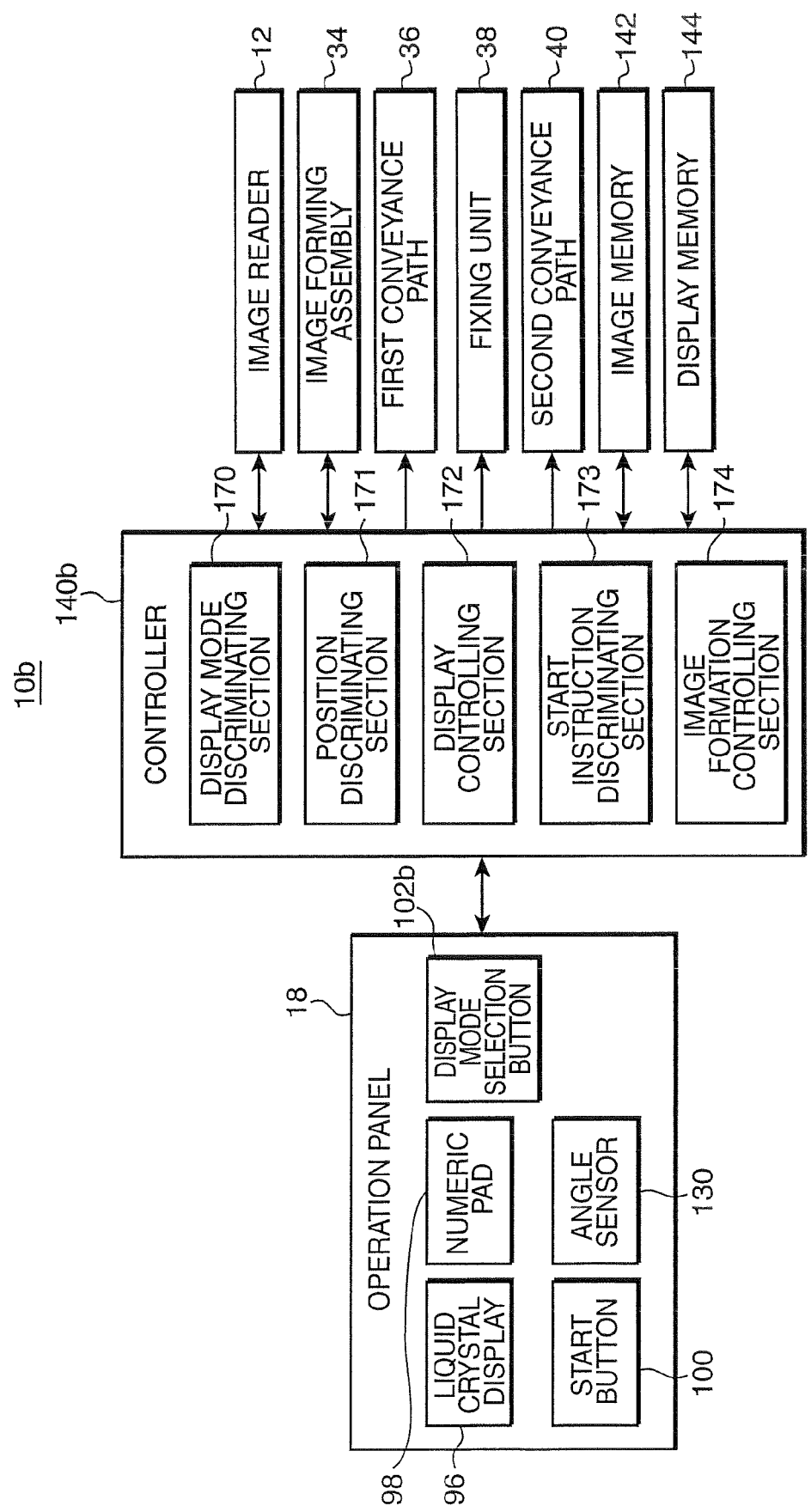
FIG. 14 is a block diagram showing an electrical construction of an image forming apparatus according to a third embodiment.

Next, an image forming apparatus 10*b* according to a third embodiment of the present invention is described. The image forming apparatus 10*b* is characterized in that an operation image displayed on the operation panel 18 is enlarged when an operation panel 18 is at a second position. In the third embodiment, elements identical to those of the first and second embodiments are not described by being identified by the same reference numerals. FIG. 14 is a block diagram showing an electrical construction of the image forming apparatus 10*b*.

The image forming apparatus 10*b* is provided with a controller 140*b* (corresponding to the support operation executing unit) for controlling an image forming operation. The controller 140*b* is constructed by a microcomputer including a CPU for executing a calculation processing, a ROM storing a processing program, data and the like, and a RAM for temporarily saving data; and controls operations in a document reader 12, an image forming assembly 34, a first conveyance path 36, a fixing unit 38 and a second conveyance path 40 in accordance with image forming conditions such as the size of recording, the magnification, the density and the number of copies to be made sheets set by means of the operation panel 18.

The controller 140*b* is connected with an image memory 142 for saving image data read by the document reader 12, and a display memory 144 storing images to be displayed on a liquid crystal display 96.

The controller 140*b* is provided with function realizing sections, i.e. a display mode discriminating section 170, a position discriminating section 171, a display controlling section 172, a start instruction discriminating section 173, and an image formation controlling section 174.

The display mode discriminating section 170 discriminates which of first and second display modes is selected. In the first display mode, a displayed state of an operation image to be displayed on the liquid crystal display 96 is so changed as to give a higher visibility when the operation panel 18 is at the second position than when the operation panel 18 is at the first position. In the second display mode, the displayed state of the operation image is the same when the operation panel 18 is at the second position as when the operation panel 18 is at the first position without being changed.

The position discriminating section 171 discriminates whether the operation panel 18 is at the first position where it is laid or at the second position where it is raised at a specified angle based on a resistance value of an angle sensor 130 that changes according to the rotation angle of the operation panel 18.

More specifically, the position discriminating section 171 discriminates that the operation panel 18 is at the second position, for example, if the resistance value of the angle sensor 130 exceeds a predetermined value while discriminating that the operation panel 18 is at the first position if the resistance value of the angle sensor 130 is equal to or below the predetermined value. Since the second position of the operation panel 18 is adjusted according to the sitting height of a wheel-chaired operator, the resistance value of the angle sensor 130 for discriminating that the operation panel 18 is at the second position is set in view of an angle range of the operation panel 18 to be adjusted.

The display controlling section 172 is for controlling the displayed state of the operation image to be displayed on the liquid crystal display 96. The display controlling section 172 displays a normal operation image shown in FIG. 16 based on a display data stored in the display memory 144 if the operation panel 18 is at the first position while displaying an enlarge operation image shown in FIG. 17 based on a display data stored in the display memory 144 if the operation panel 18 is at the second position when the first mode is selected. The display controlling section 172 also controls the scroll display in the case of enlargedly displaying the operation image.

The start instruction discriminating section 173 discriminates whether or not any instruction has been given to form an image on a recording sheet by discriminating whether or not the start button 100 has been turned on. The image formation controlling section 174 forms an image on a recording sheet based on an image data saved in the image memory 142 by causing the image forming assembly 34 and the like to operate.

Figure 15:
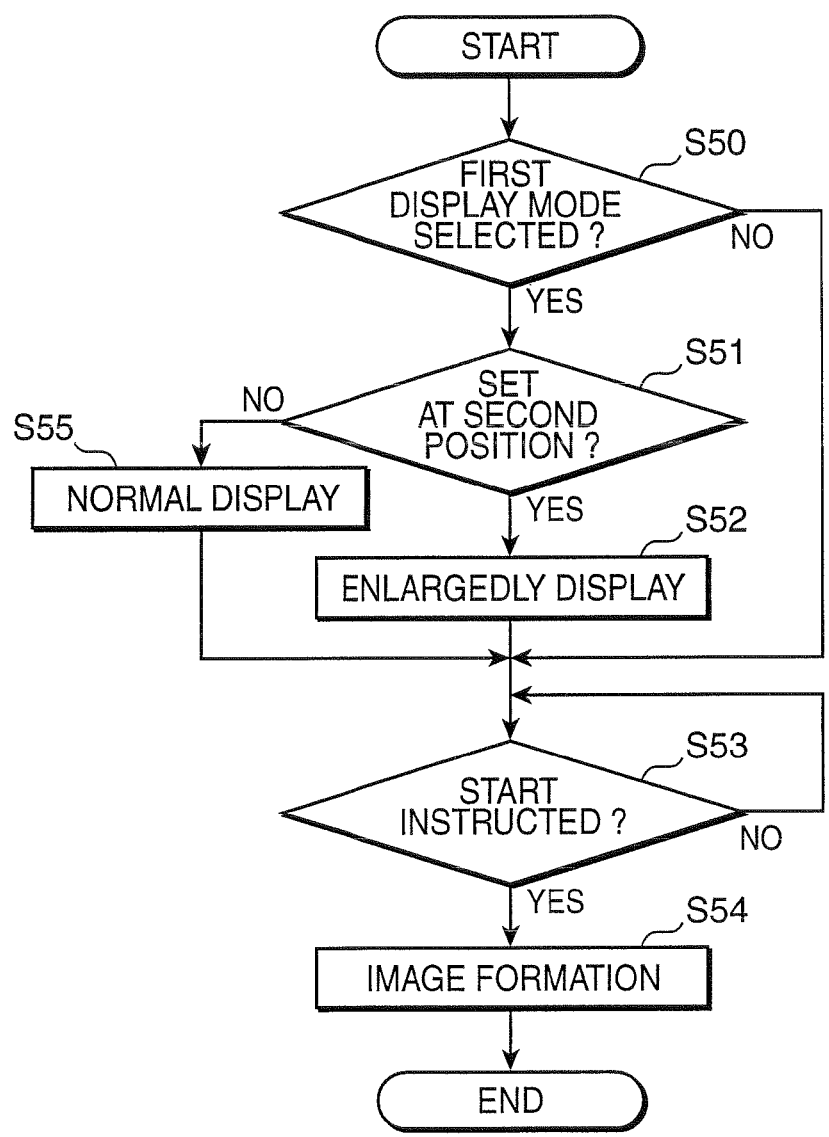
FIG. 15 is a flow chart showing an exemplary operation in the case of forming an image on a recording sheet in the image forming apparatus of the third embodiment.

FIG. 15 is a flow chart showing an exemplary operation of the image forming apparatus 10b in the case of forming an image on a recording sheet. First, if the operation panel 18 is at the second position, the display mode discriminating section 170 discriminates whether or not the first display mode has been selected to change the display state of the operation image to be displayed on the liquid crystal display 96 (Step S50). If the discrimination result in Step S50 is positive, the position discriminating section 171 discriminates whether or not the operation panel 18 is at the second position (Step S51).

Figure 17:
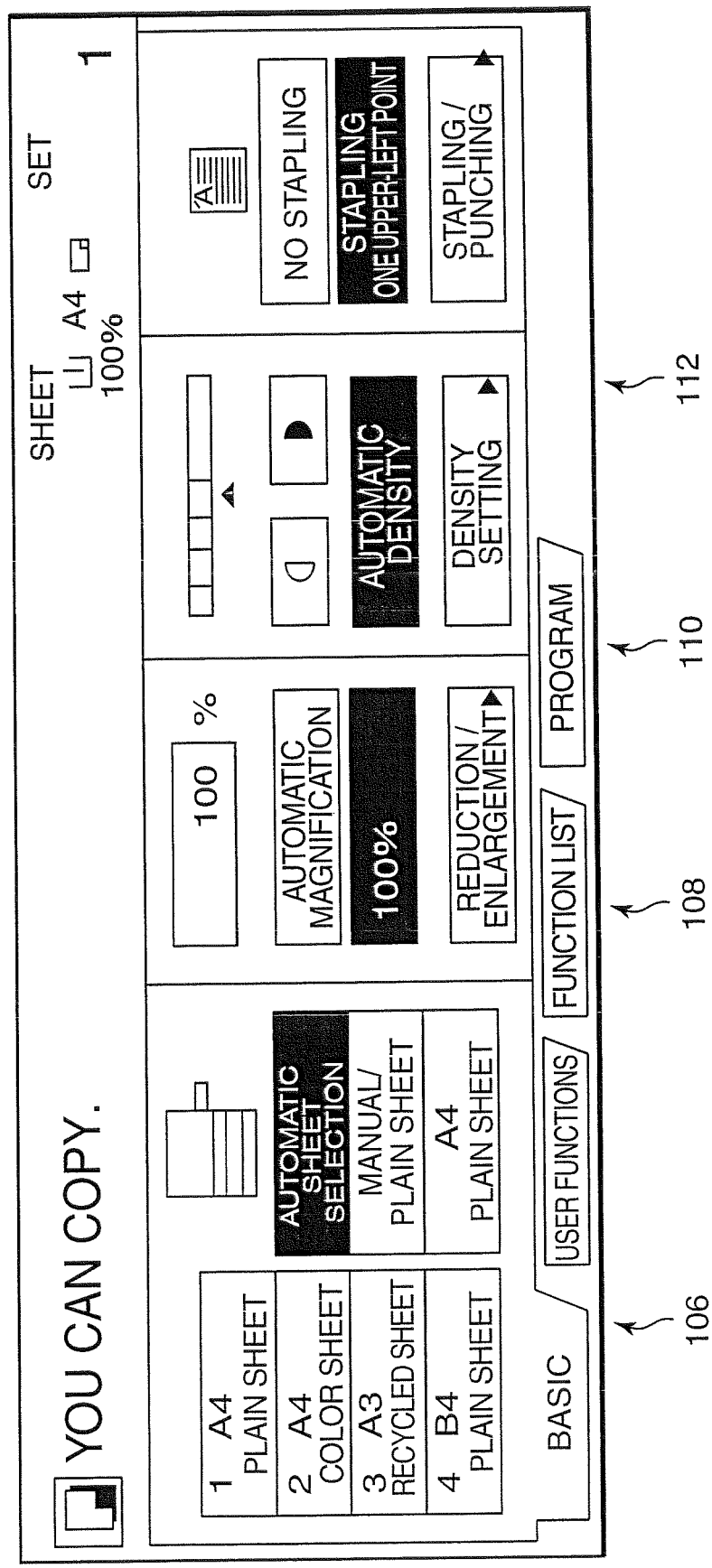
FIG. 17 is a diagram showing an enlarged operation image.

If the discrimination result in Step S51 is positive, the enlarged operation image shown in FIG. 17 is displayed on the liquid crystal display 96 in accordance with the control of the display controlling section 172 (Step S52). After image forming conditions such as the size of the recording sheet, the magnification and the density are set on the displayed enlarged operation image by an operator, the start instruction discriminating section 173 discriminates whether or not a start instruction has been given (Step S53). If the discrimination result in Step S53 is positive, the image forming assembly 34 and the like are controllably driven by the image formation controlling section 174 to form an image on the recording sheet (Step S54).

Figure 16:
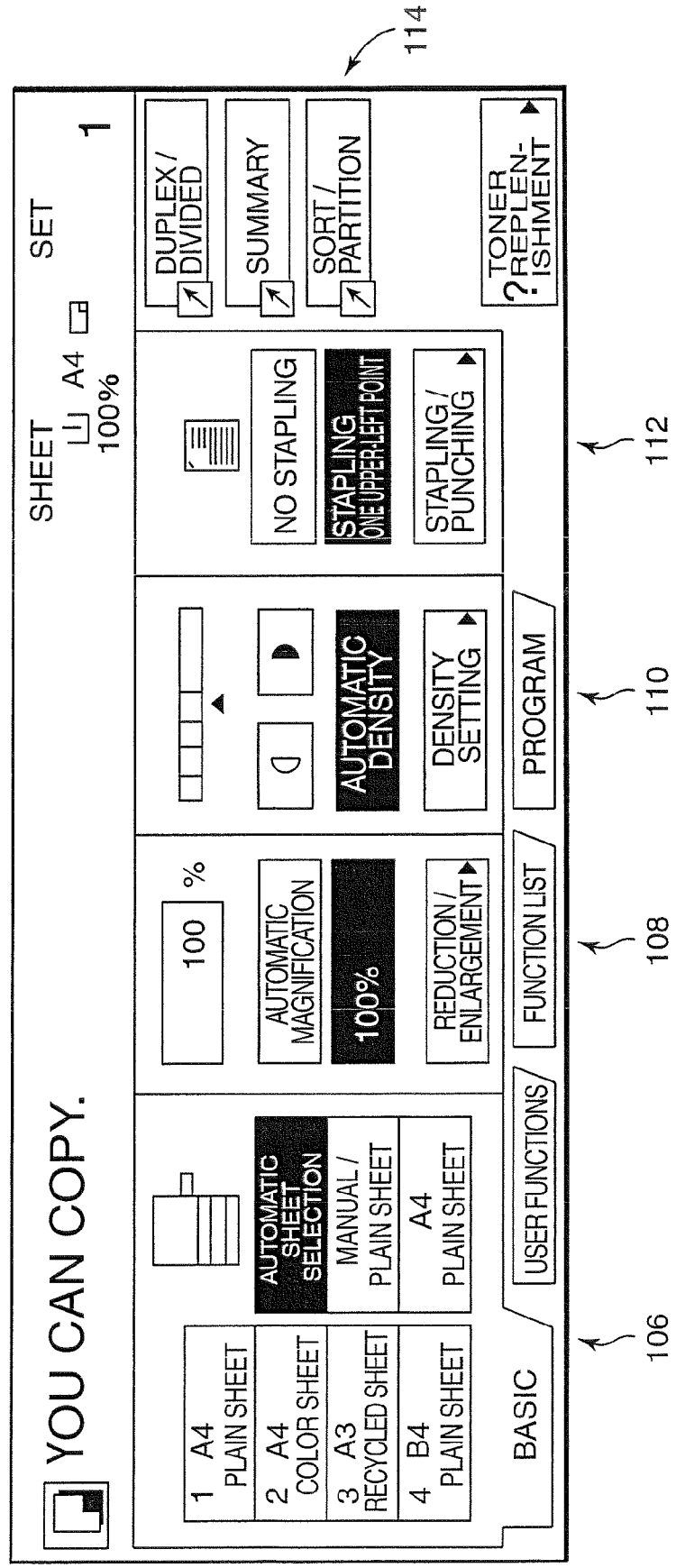
FIG. 16 is a diagram showing a normal operation image.

If the discrimination result in Step S50 is negative, this routine proceeds to Step S53. If the discrimination result in Step S51 is negative, this routine proceeds to Step S53 after the normal operation image shown in FIG. 16 is displayed on the liquid crystal display 96 in accordance with the control of the display controlling section 172 (Step S55). If the discrimination result in Step S53 is negative, this routine waits on standby until the discrimination result becomes positive.

The image forming apparatus 10b of the third embodiment is constructed as above, and the enlarged operation image is displayed on the liquid crystal display 96 if the first display mode is selected by operating the display mode selection button 102c and the operation panel 18 is detected to be at the second position, wherefore the visibility of the operation panel 18 for wheel-chaired handicapped people is improved, resulting in a better operability.

The present invention is not limited to the third embodiment, and may be embodied in various manners, for example, as described below, if necessary.

In the third embodiment, the enlarged operation image is displayed on the liquid crystal display 96 when the operation panel 18 is at the second position where it is raised at the specified angle. However, the present invention is not limited thereto. For example, the visibility of the operation image may be improved by increasing the brightness of the operation image on the liquid crystal display 96 or displaying a multicolor image instead of a monochromatic image. This can ensure a better operability. It is sufficient to change the displayed state in order to have a higher visibility of the operation image when the operation panel 18 is at the second position where it is raised at the specified angle than when the operation panel 18 is at the first position where it is laid.

Although the displayed content of the operation image on the liquid crystal display 96 is same regardless of whether the operation panel 18 is at the first position where it is laid or at the second where it is raised at the specified angle position in the third embodiment, the resent invention is not limited thereto. For example, it is also possible to display an enlarged operation image while omitting some of the automatically settable image forming conditions such as the size of the recording sheet and the density when the operation panel 18 is at the second position.

In the third embodiment, the enlarged operation image shown in FIG. 17 is displayed when the operation panel 18 is at the second position where it is raised at the specified angle. However, the present invention is not limited thereto. For example, a plurality of second positions where the operation panel 18 is raised at specified angles may be prepared stepwise, and the magnification of the operation image may be changed based on the set second position. In other words, if three second positions where the operation panel 18 are at angles θa, θb, θc (θa<θb<θc) to the horizontal plane are assumed to be set, the magnification is, for example, set to be larger when the operation panel 18 is at the angle θc than when the operation panel 18 is at the angle θb and set to be larger when the operation panel 18 is at angle θc than when the operation panel 18 is at the angle θb.

Although the first and second display modes are alternatively selected in the third embodiment, the present invention is not limited thereto. For example, if the operation panel 18 is at the second position where it is raised at the specified angle, the displayed state of the operation image to be displayed on the liquid crystal display 96 may be always changed.

Although the liquid crystal display 96 of the operation panel 18 constructs a touch panel in the third embodiment, the present invention is not limited thereto. For example, the liquid crystal display 96 may be adopted to display specified messages for image formation. The touch panel may be constructed by a CRT display instead of by the liquid crystal display 96.

Next, an image forming apparatus 10c according to a fourth embodiment of the present invention is described.

Figure 18:
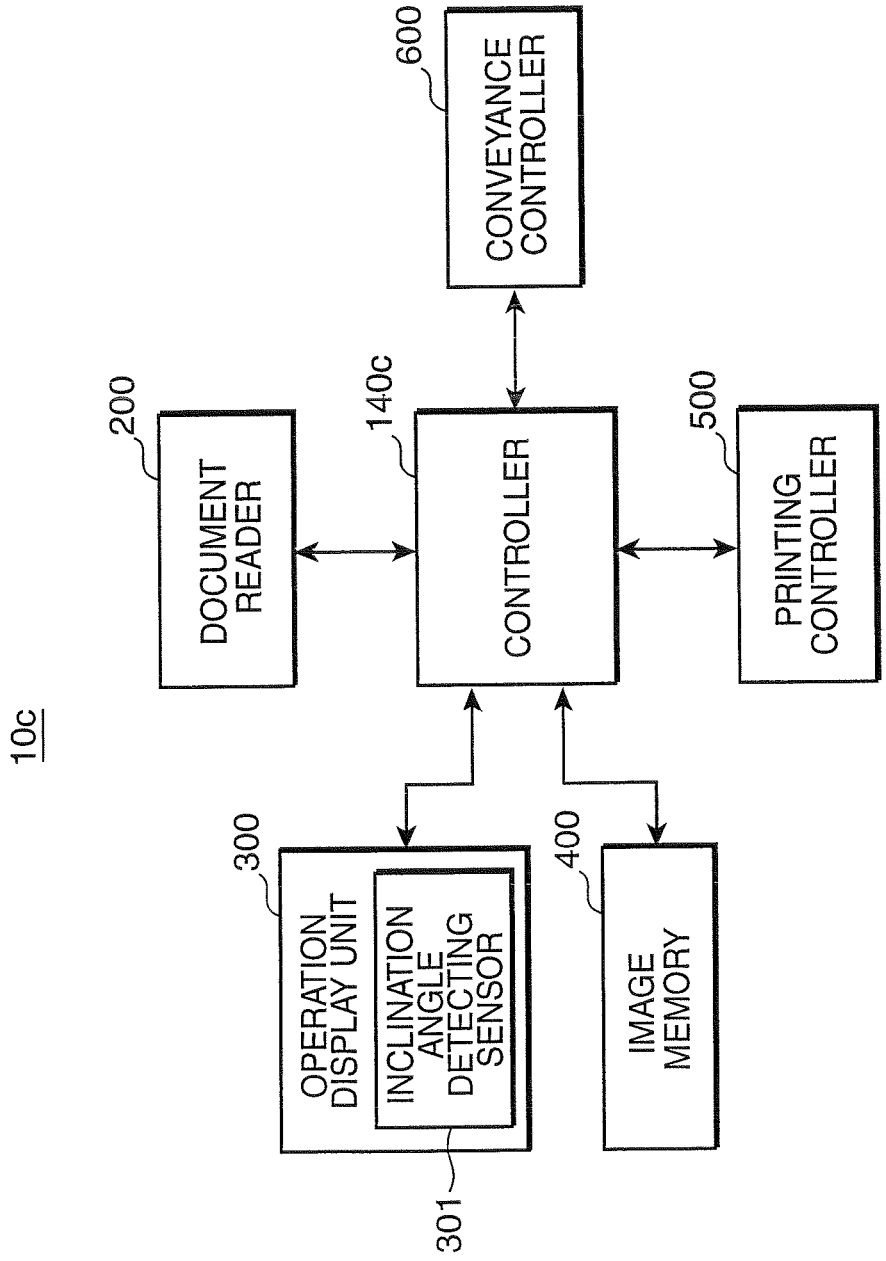
FIG. 18 is a block diagram showing an electrical construction of an image forming apparatus according to a fourth embodiment.

FIG. 18 is a block diagram showing an electrical construction of the image forming apparatus 10c. The image forming apparatus 10c is characterized by rotating an operation image to be displayed on an operation panel 18 according to the rotation angle of the operation panel 18. In the fourth embodiment, elements identical to those of the first to third embodiments are not described by being identified by the same reference numerals. The function button 102 shown in FIG. 1 is a display mode selection button 102c for setting the operation mode of the image forming apparatus 10c to a rotating mode or a nonrotating mode to be described later.

The image forming apparatus 10c is provided with a document reader 200, an operation display unit 300, an image memory 400, a printing controller 500, a conveyance controller 600 and a controller 140c. The document reader 200 is so constructed as to be identical with the document reader 12 shown in FIG. 2 and obtains a document image data by reading a document.

The operation display unit 300 is constructed to include the operation panel 18 shown in FIG. 1, and receives various operation commands entered by a user. The operation display unit 300 includes an inclination angle detecting sensor 301 for detecting an angle of inclination of the operation display unit 300. This inclination angle detecting sensor 301 is constructed to include the angle sensor 130 shown in FIG. 3.

The image memory 400 is for saving image data obtained by the document reader 200. The printing controller 500 controls the image forming assembly 34 shown in FIG. 2 to print a document image data on a recording sheet.

The conveyance controller 600 controls the pairs of conveyance rollers 78 shown in FIG. 2 to control the conveyance of the recording sheet. The controller 140c (corresponding to the support operation executing unit) includes a CPU and the like for centrally governing the image forming apparatus 10c. The controller 140c also causes the operation image to be displayed while being rotated according to the angle of inclination of the operation display unit 300.

In addition, the controller 140c sets the operation mode of the image forming apparatus 10c either to the rotating mode or to the nonrotating mode in accordance with an operation command from a user. The operation image is rotated according to the angle of inclination of the operation panel 18 in the rotating mode, whereas the operation image is not rotated according to the angle of inclination of the operation panel 18 in the nonrotating mode.

The controller 140c also causes the operation image to be displayed on the operation panel 18 while being rotated according to the rotation angle of the operation panel 18.

Next, the operation of the image forming apparatus 10c is described in accordance with a flow chart shown in FIG. 19. First, if the operation display unit 300 receives an operation command from a user to set the operation mode to the rotating mode in Step S60 (YES in Step S60), the controller 140c sets the operation mode of the image forming apparatus 10c to the rotating mode (Step S61). Here, the operation display unit 300 receives the operation command to set the operation mode when the user presses the display mode selection button 102c.

If the angle of inclination of the operation display unit 300 is changed and the controller 140c receives a detection signal representing an angle of inclination and outputted from the inclination angle detecting sensor 301 in Step S62 (YES in Step S62), the controller 140c executes a processing to rotate the operation image based on the received angle of inclination (Step S63) and causes the operation image after the rotation processing to be displayed on the operation display unit 300 (Step S64).

Figure 20A:
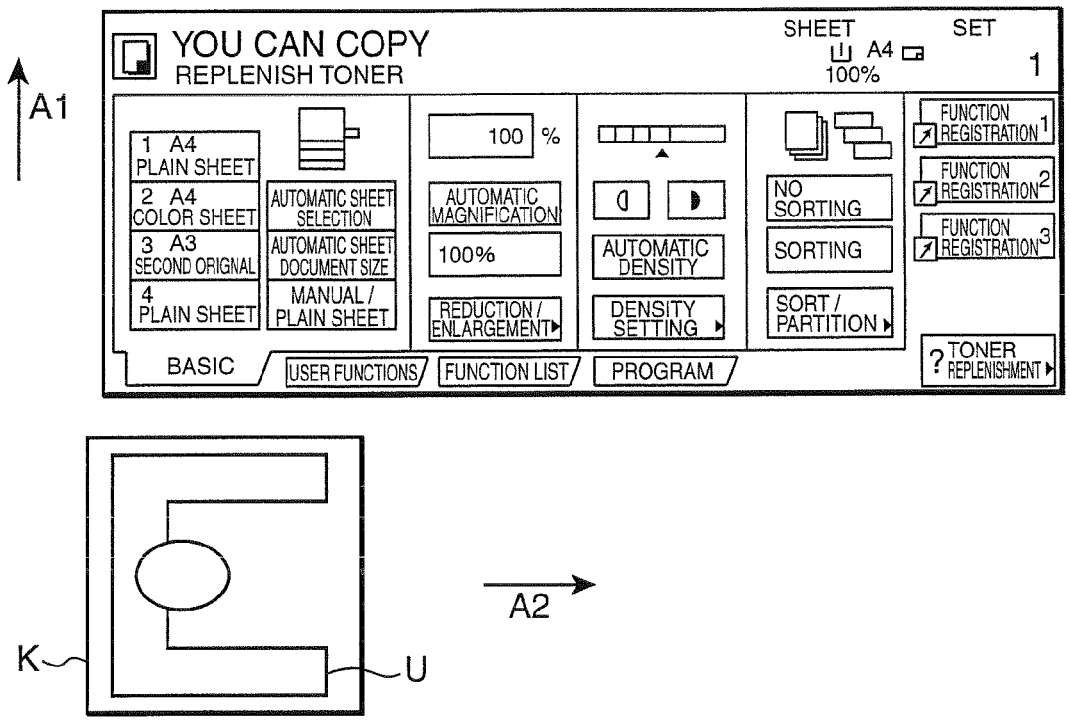
Figure 20B:
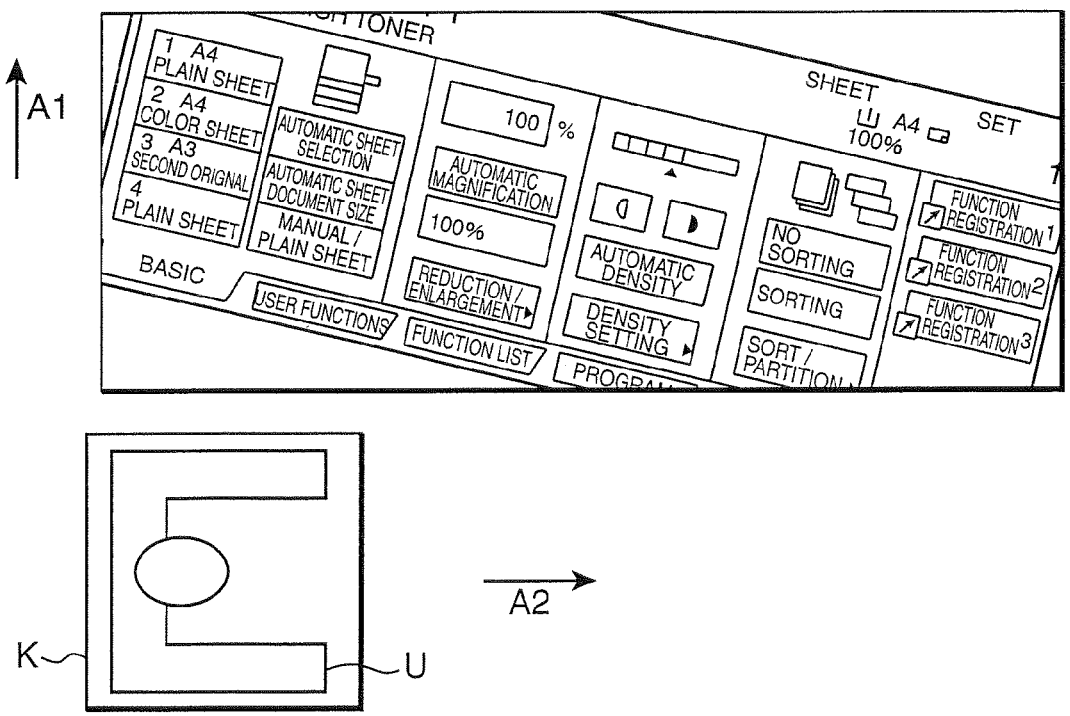

Here, the controller 140c executes the processing of a first pattern or a second pattern described below to rotate the operation image. FIGS. 20A and 20B are diagrams showing the operation images rotated by the first pattern, wherein FIG. 20A shows a case where the angle of inclination of the operation display unit 300 is 0° and FIG. 20B shows a case where it is approximately 20°. The rotation processing of the first pattern is for rotating the entire operation image according to the angle of inclination of the operation display unit 300. The operation images shown in FIGS. 20A and 20B are those of defaults of the image forming apparatus 10c.

It can be understood that the operation image is displayed such that direction A1 is upward direction as shown in FIG. 20A if the angle of inclination of the operation display unit 300 is 0°. On the other hand, it can be understood that the operation image is rotated by the angle of inclination of the operation display unit 300 with respect to direction A1 as shown in FIG. 20B. It should be noted that direction A2 is normal to direction A1 and the facing direction of a user U.

Figure 21A:
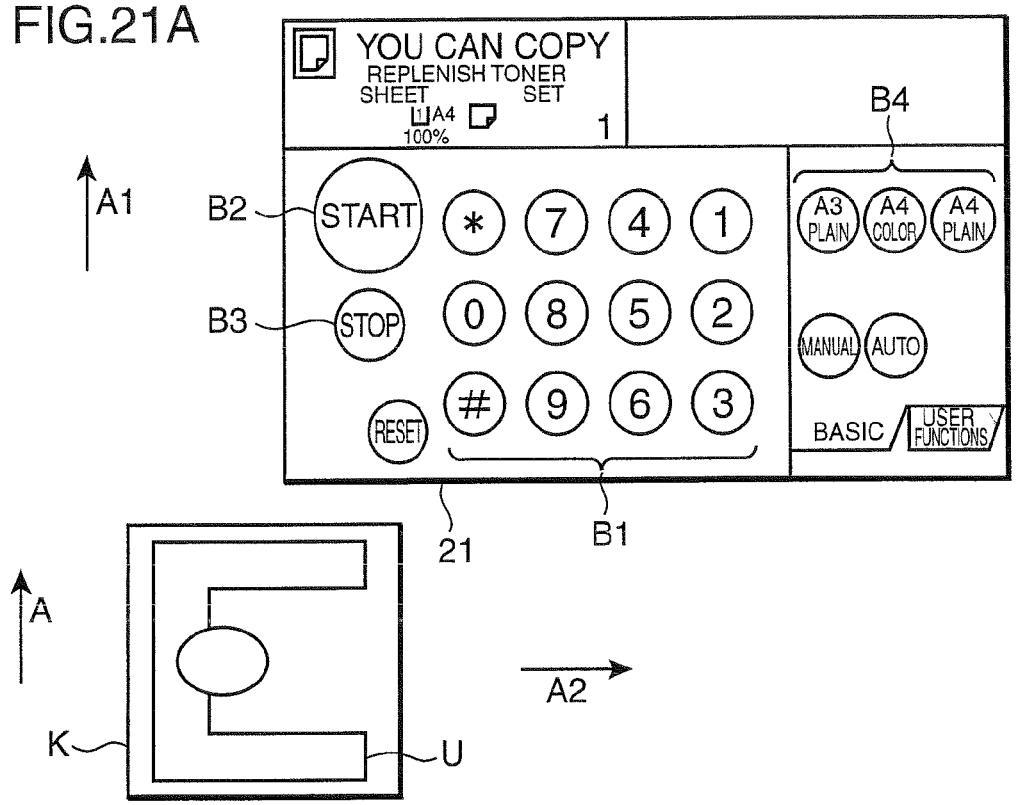
Figure 21B:
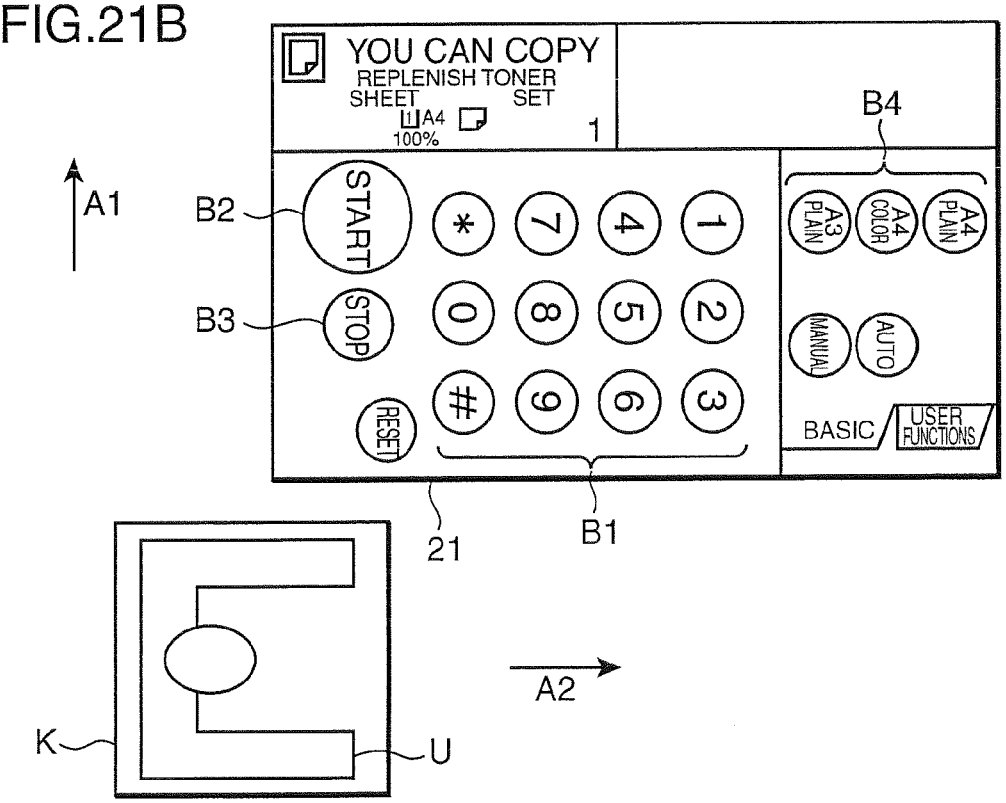

FIGS. 21A and 21B are diagrams showing operation images rotated by the second pattern, wherein FIG. 21A shows a case where the angle of inclination of the operation display unit 300 is 0□ and FIG. 21B shows a case where it is 90°.

Round buttons B1 to B4 are displayed on the operation image shown in FIGS. 21A and 21B. The round buttons B1 constitute a numeric pad used to enter the number of copies to be made. The round button B2 is a start key used to start a copying operation. The round button B3 is a stop key used to stop the copying operation. The round buttons B4 are for setting the kind of the recording sheet used for the copying operation.

In the case of FIG. 21A, the controller 140c generates such an operation image showing characters on the round buttons B1 to B4 such that upward direction is direction A1 since the angle of inclination of the operation display unit 300 is 0°, and causes the generated operation image to be displayed on the operation display unit 300.

On the other hand, in the case of FIG. 21B, the controller 140c generates such an operation image showing characters on the round buttons B1 to B4 rotated by 90° with respect to direction A1 since the angle of inclination of the operation display unit 300 is 90°, and causes the generated operation image to be displayed on the operation display unit 300.

In this way, the controller 140c rotates the entire operation image or part of the operation image by the angle of inclination of the operation display unit 300 with respect to direction A1 and causes the resulting operation image to be displayed on the operation display unit 300.

Accordingly, the operability of the operation image can be improved if the user U in a wheel chair K stops the wheel chair K with facing direction A2 turned about 90° with respect to direction A1 and operates the operation display unit 300 as shown in FIGS. 20 and 21, i.e. if the user U lays the wheel chair K along the front surface of the operation display unit 300 and operates the operation display unit 300. Thus, the user U in the wheel chair K can easily operate the operation image without stopping the wheel chair K such that the facing direction A2 of the wheel chair K substantially coincides with direction A1.

In Step S65 shown in FIG. 19, the controller 140c judges whether or not the operation mode has been changed from the rotating mode to the nonrotating mode. This routine ends if the operation mode has been changed to the nonrotating mode (YES in Step S65) while returning to Step S62 if the rotating mode has been kept (NO in Step S65).

As described above, since the operation image is displayed while being rotated according to the angle of inclination of the operation display unit 300 in the image forming apparatus 10c of the fourth embodiment, operability can be improved in the case of operating the operation image while the wheel chair K is stopped along the front surface of the image forming apparatus 10c.

In the rotation processing of the second pattern, the buttons displayed in the operation image are round and the operation image is rotationally displayed by rotating the characters displayed on the buttons. Thus, the operation image can be displayed on the operation display unit 300 without being left out.

The present invention may also be embodied as follows.

Although the operation image is displayed while being rotated according to the angle of inclination of the operation display unit 300 in the fourth embodiment, the present invention is not limited thereto. The operation image may be displayed in a rotated manner if the angle of inclination of the operation display unit 300 exceeds a predetermined value. In such a case, the rotation angle of the operation image may be set at 0° when the angle of inclination is equal to or below the predetermined value while being increased as the angle of inclination increases. Alternatively, the rotation angle of the operation image may be set at this predetermined value when the angle of inclination is equal to or below the predetermined value while being set to be equal to the angle of inclination of the operation display unit 300 when the angle of inclination of the operation display unit 300 is above the predetermined value.

Further, although the rotation angle of the operation image is set to be equal to the angle of inclination of the operation display unit 300 in the fourth embodiment, the present invention is not limited thereto. For example, the rotation angle of the operation display unit 300 may be set at 0° with the angle of inclination of 0° to 9°, at 10° with the angle of inclination of 10° to 19°, and so on, thereby changing the rotation angle of the operation image stepwise according to the angle of inclination of the operation display unit 300.

Furthermore, although the angle of inclination of the operation display unit is 0° to 90° in the fourth embodiment, the present invention is not limited thereto. The angle of inclination of the operation display unit 300 may be adjustable within a specified angle range below 90° or up to a specified angle larger than 90°. In the latter case, the rotation angle of the operation image may be kept at 90° if the angle of inclination of the operation display unit 300 exceeds 90°.

Next, an image forming apparatus 10d according to a fifth embodiment of the present invention is described. The image forming apparatus 10d is characterized in that the operation mode is set to a normal operation mode when an operation panel 18 is raised from a normal state. In the fifth embodiment, elements identical to those of the first to fourth embodiments are not described by being identified by the same reference numerals.

Figure 22:
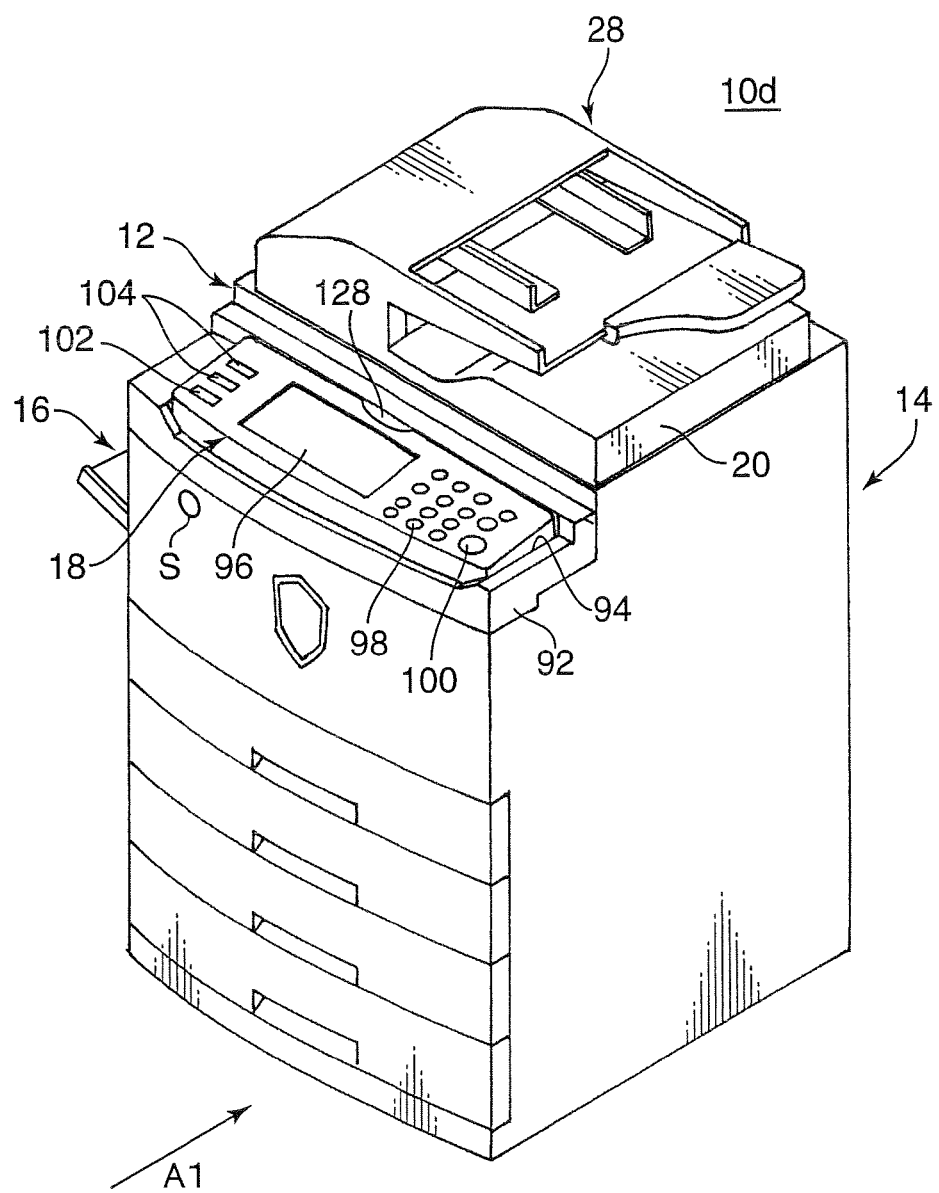
FIG. 22 is a perspective view showing an external construction of an image forming apparatus according to a fifth embodiment of the invention.

FIG. 22 is a perspective view schematically showing an external construction of the image forming apparatus 10d according to the fifth embodiment. A point of difference to FIG. 1 is that a switch S is disposed on the front surface of a main unit 14.

Figure 23:
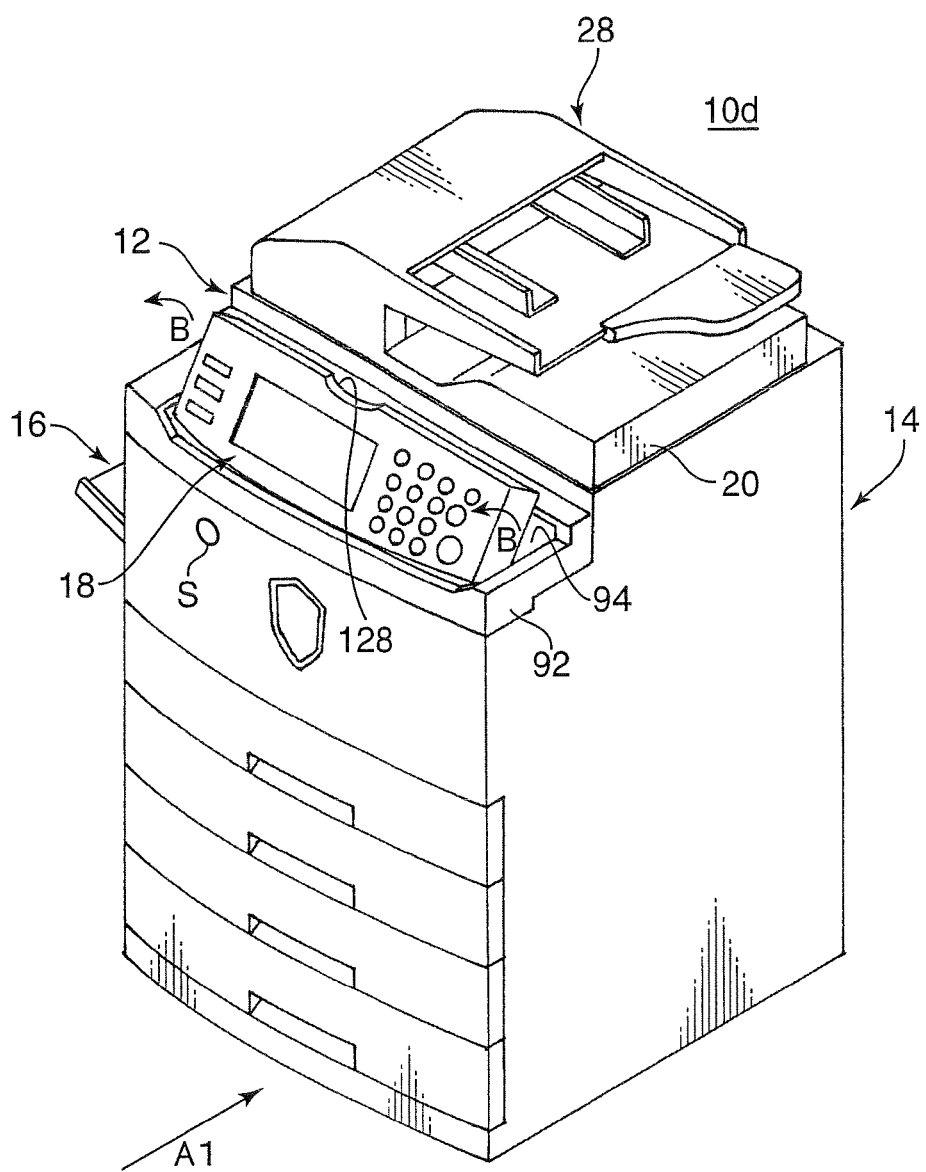
FIG. 23 is a perspective view showing the image forming apparatus of the fifth embodiment with an operation panel raised.

FIG. 23 is a perspective view of the image forming apparatus 10d showing the operation panel 18 having the angle of inclination thereof adjusted. The operation panel is so mounted in a recessed space 94 of a frame 92 forming part of a casing 30 as to be rotatable in directions of arrow B about its front side as shown in FIG. 23. Here, an angle formed between the operation panel 18 and the frame 92 is referred to as an angle of inclination. The angle of inclination of the operation panel 18 can be adjusted within a range of 0° to 90°, a range of 0° to 60° or a range of 0° to 45°.

In the case of the angle of inclination of 0°, an operation surface of the operation panel 18 is in parallel with horizontal direction. Thus, the angle of inclination of the operation panel 18 is an angle of inclination to horizontal direction. An arrow A1 shown in FIGS. 22 and 23 indicates a direction toward the front side of the image forming apparatus 10d.

Figure 24A:
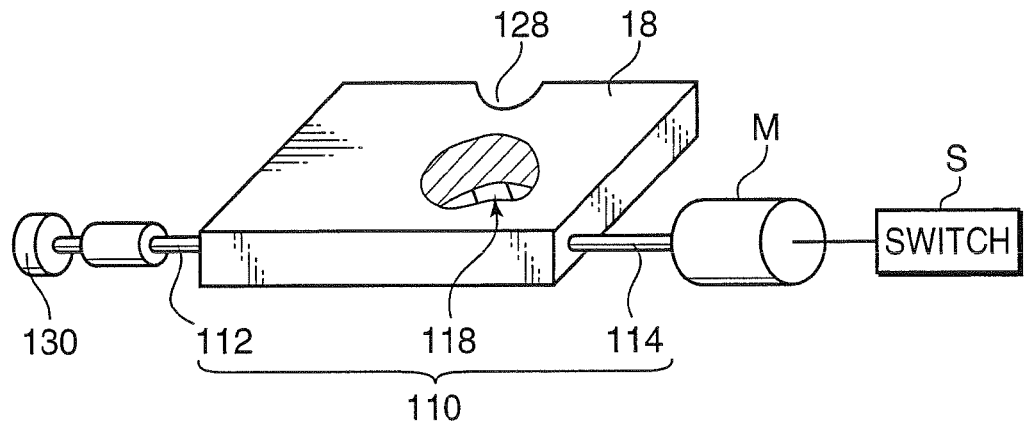
FIGS. 24A to 24C are diagrams showing an operation-panel supporting unit.
Figure 24B:
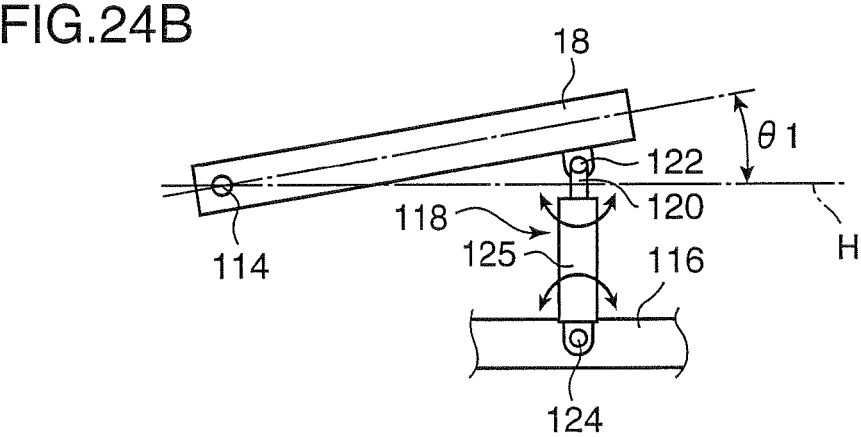
Figure 24C:
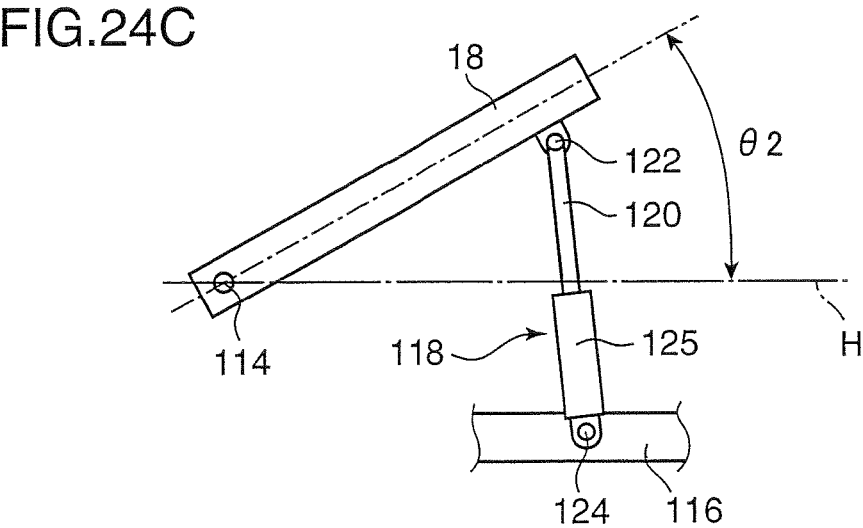

FIGS. 24A to 24C are diagrams showing a mechanism for adjusting the angle of inclination of the operation panel 18. It should be noted that elements of FIGS. 24A to 24C identical to those of FIGS. 3A to 3C are not described by being identified by the same reference numerals.

The operation panel 18 is made rotatable between a first state where the operation panel 18 is at an angle $\theta 1$ ($\theta 1$ may be 0°) to a horizontal plane H identical with the floor surface as shown in FIG. 24B and a second state where the operation panel 18 is at an angle $\theta 2$ ($\theta 2 > \theta 1$ and $\theta 2$ may be 90°) to the horizontal plane H as shown in FIG. 24C by giving a specified torque to the operation panel 18. Here, the operation panel 18 is in a normal state when being in the first state, and in a raised state when being in the second state.

A motor M for rotating the operation panel 18 is connected with a shaft 114. The switch S is connected with this motor M. The motor M is activated to increase the angle of inclination of the operation panel 18 while the switch S is pressed. When the switch S1 is released, the motor M is turned off to stop the rotation of the operation panel 18.

The rotation of the operation panel 18 in such a direction as to decrease the angle of inclination of the operation panel 18 is made by a user's force, i.e. manually made. If the switch S is kept on until the angle of inclination of the operation panel 18 reaches a maximum angle (e.g. 90°), the motor M is turned off.

Figure 25:
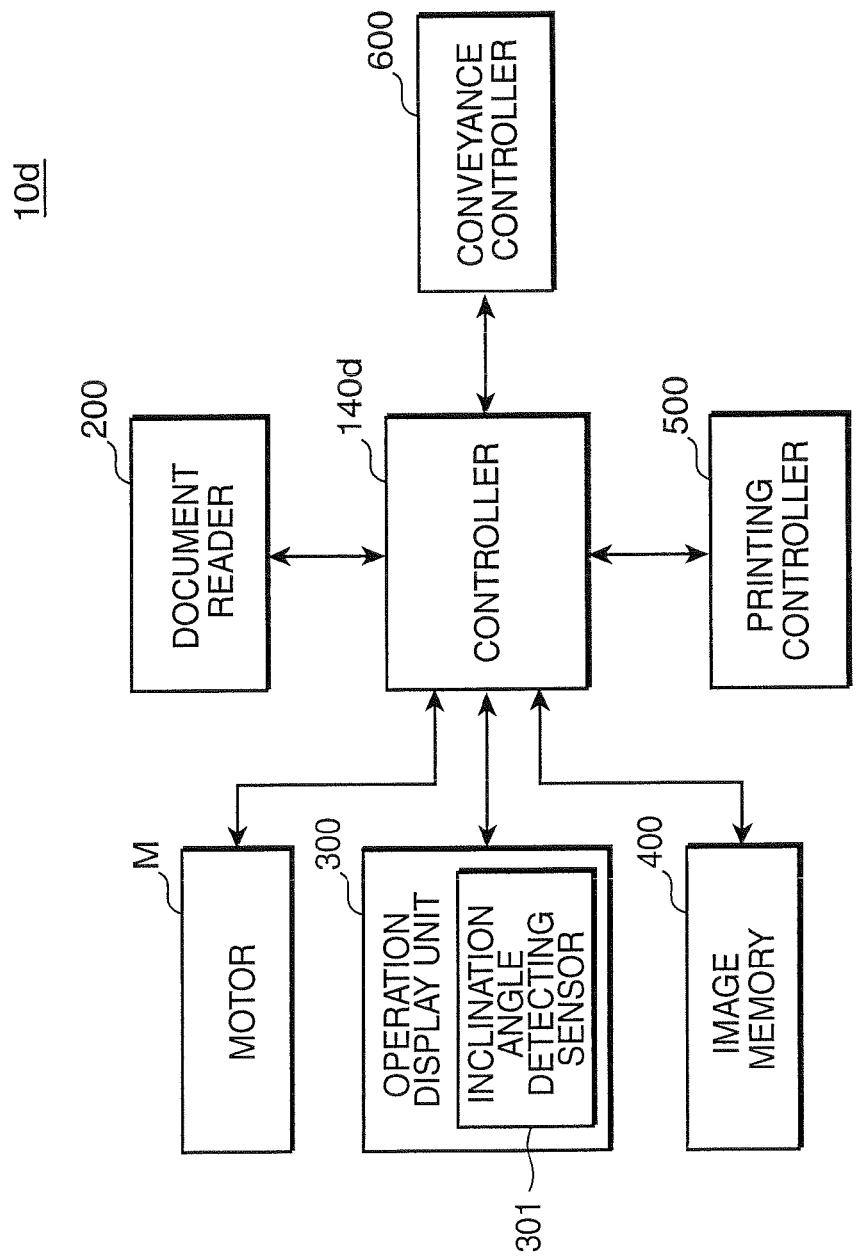
FIG. 25 is a block diagram showing an electrical construction of the image forming apparatus of the fifth embodiment.

FIG. 25 is a block diagram showing an electrical construction of the image forming apparatus 10d. Here, only points of difference are described without describing the elements of FIG. 25 identical to those of FIG. 18.

A controller 140d (corresponding to the support operation executing unit) sets the operation mode of the image forming apparatus 10d either to a power saving mode or to a normal operation mode. Here, the power saving mode is set if the image forming apparatus 10d has not been used for a predetermined period, thereby stopping the power supply to some of units of the image forming apparatus 10d such as an exposing device 64.

In the normal operation mode, the power supply to none of the units of the image forming apparatus 10d is stopped. The controller 140d is provided with a timer function and detects the lapse of the predetermined time using this timer function.

The controller 140d also discriminates, with the power saving mode set, whether or not the state of the operation panel 18 has been changed from the normal state to the raised state based on the angle of inclination of the operation panel 18 detected by an inclination angle detecting sensor 301, and sets the normal operation mode in the image forming apparatus 10d if the discrimination result is positive.

Figure 26:
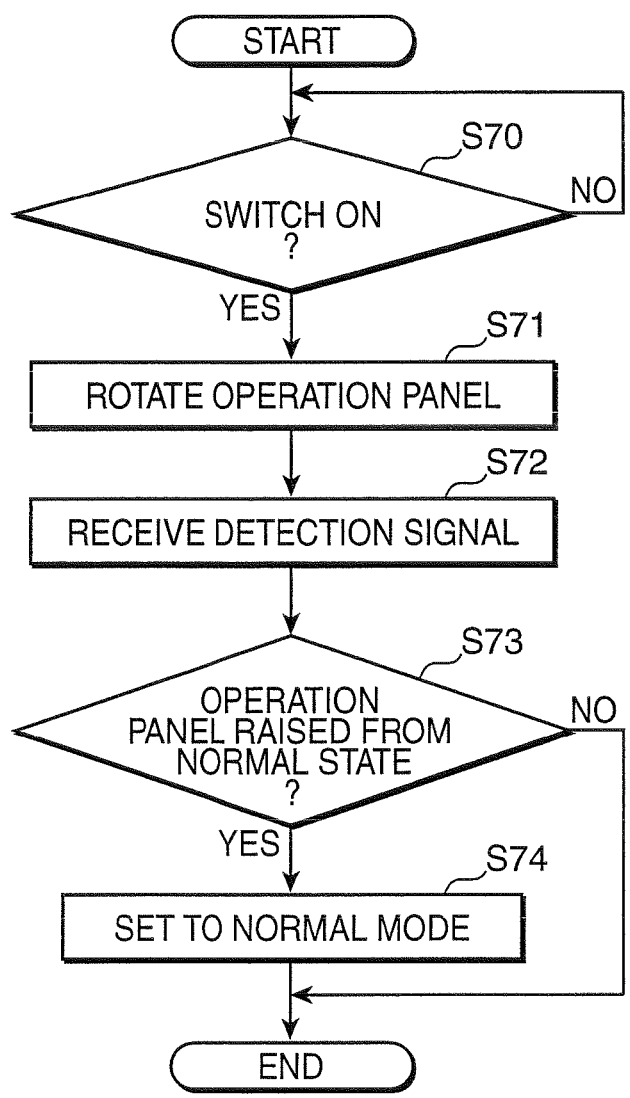
FIG. 26 is a flow chart showing the operation of the image forming apparatus of the fifth embodiment.

Next, the operation of the image forming apparatus 10d is described with reference to a flow chart shown in FIG. 26. First, when the switch S is turned on by a user in Step S70 (YES in Step S70), the controller 140d outputs a drive signal to the motor M to rotate the operation panel (Step S71). On the other hand, this routine returns to Step S70 as long as the switch S is not turned on by the user (NO in Step S70).

In Step S72, the controller 140d receives a detection signal outputted from the inclination angle detecting sensor 301. Here, the inclination angle detecting sensor 301 outputs an electrical signal of a level corresponding to the angle of inclination of the operation panel 18 to the controller 140*d* as a detection signal.

In Step S73, the controller 140*d* discriminates whether or not the operation panel 18 has been raised from the normal state in accordance with the detection signal outputted from the inclination angle detecting sensor 301. Here, the controller 140*d* judges that the operation panel 18 is in the raised state if the angle represented by the detection signal outputted by the inclination angle detecting sensor 301 is equal to or larger than a specified angle while judging that the operation panel 18 is in the normal state if the represented angle is below the specified angle. Here, the specified angle is an angle predetermined to discriminate whether the operation panel 18 is in the raised state or in the normal state.

The controller 140*d* sets the normal operation mode in the image forming apparatus 10*d* (Step S74) if the discrimination result in Step S73 is positive, whereas this routine ends if the discrimination result in Step S73 is negative.

As described above, according to the image forming apparatus 10*d*, the operation mode is switched to the normal operation mode if the operation panel 18 is rotated with the power saving mode set in the image forming apparatus 10*d*. Thus, the user can return the operation mode of the image forming apparatus 10*d* from the power saving mode to the normal operation mode without touching the liquid crystal display 96, thereby improving operability for physically handicapped people.

Although the angle of inclination of the operation panel 18 is increased upon receiving a torque from the motor M in the fifth embodiment, the present invention is not limited thereto and it may be manually increased. In such a case, the operation panel 18 is rotated by placing hooked fingertips at a recess 128 formed in the middle of the rear end of the operation panel 18 to exert a force in rotating direction about the shafts 112, 114. In the case of the manual rotation, the motor M and the switch S can be omitted to reduce the number of parts, leading to a cost reduction.

Although the angle of inclination of the operation panel 18 is manually decreased in the fifth embodiment, the present invention is not limited thereto and it may be decreased by the motor M. In such a case, a motor rotatable in forward and reverse directions may be adopted as the motor M. Alternatively, the switch S may be a lever-switch, wherein the angle of inclination of the operation panel 18 may be increased when the lever is turned toward one side while being decreased when the lever is turned toward the other side.

Next, an image forming apparatus 10*e* according to a sixth embodiment of the present invention is described. The image forming apparatus 10*e* is characterized in that set values are cleared when an operation panel 18 is raised. In the sixth embodiment, elements identical to those of the first to fifth embodiments are not described by being identified by the same reference numerals. Further, a perspective view schematically showing an external construction according to in the sixth embodiment uses FIG. 1.

In the sixth embodiment, the function button 102 shown in FIG. 1 is a mode selection button 102*e*. The mode selection button 102*e* is for setting the image forming apparatus 10*e* either to a clear mode for resetting values set for various items to default or to a nonclear mode for not resetting the set values for various items to the defaults when the operation panel 18 is raised from a normal state.

Figure 27:
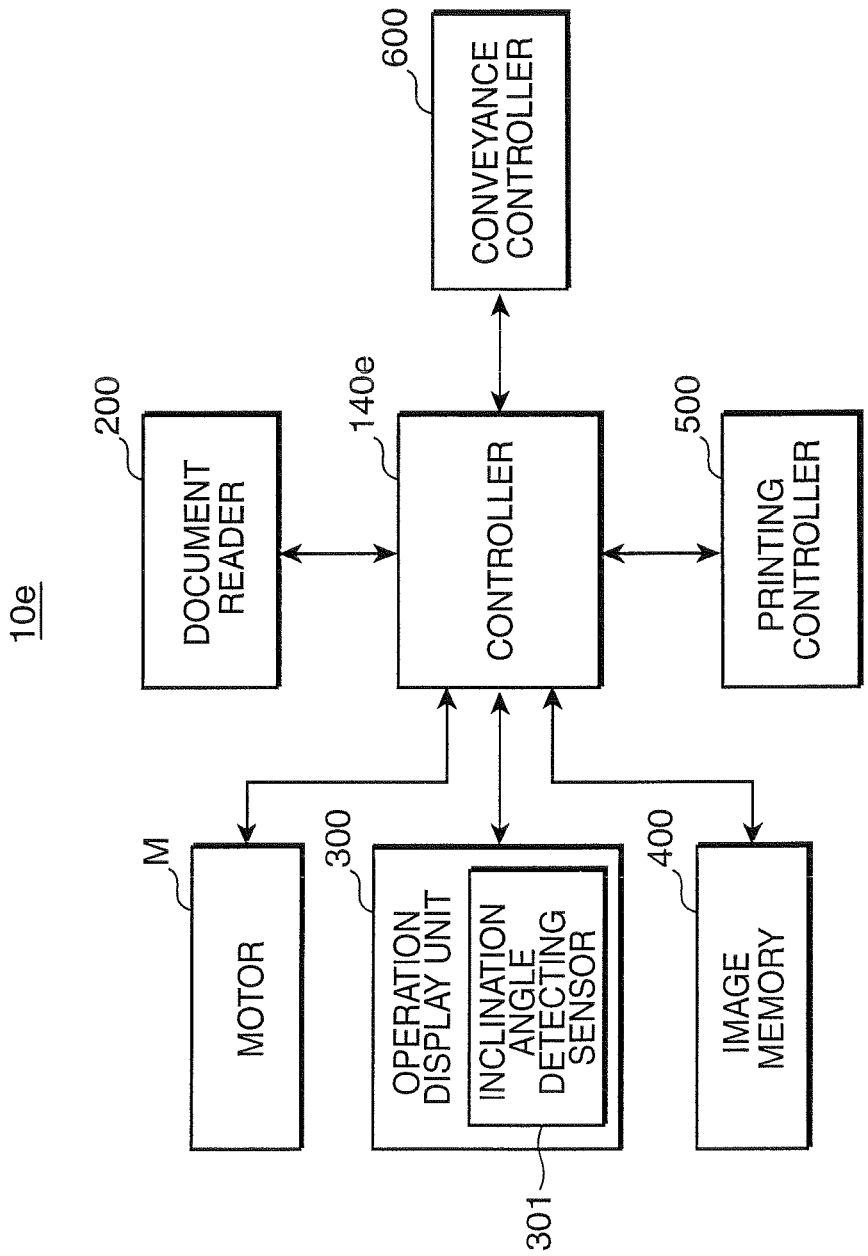
FIG. 27 is a block diagram showing an electrical construction of an image forming apparatus according to a sixth embodiment of the invention.

FIG. 27 is a block diagram showing an electrical construction of the image forming apparatus 10*e*. Here, only points of difference are described without describing the elements of FIG. 27 identical to those of FIG. 25. The operation panel 18 is rotated by the construction shown in FIGS. 24A to 24C.

A controller 140*e* (corresponding to the support operation executing unit) registers values set for various items by a user operating the operation panel 18, for example, by saving them in an unillustrated memory in correspondence with the set items.

The controller 140*e* also sets the image forming apparatus 10*e* to the clear mode if the mode selection button 102*e* is operated to select the clear mode while setting the image forming apparatus 10*e* to the nonclear mode if the nonclear mode is selected.

In addition, the controller 140*e* resets the values set for the various items to the defaults to clear the setting when the operation panel 18 is raised from the normal state. Various set items include the size of recording sheets, the number of copies to be made, the magnification and the copy density.

Set values for the size of recording sheets include A4, A5 and the like, wherein the default is, for example, A4. Set values for the number of copies to be made include one set, two sets and the like, wherein the default is one set. Set values for the magnification include 100%, 150% and the like, wherein the default is, for example, 100%. Set values for the copy density include normal density, dark density, and the like, wherein the default is, for example, normal density.

Figure 28:
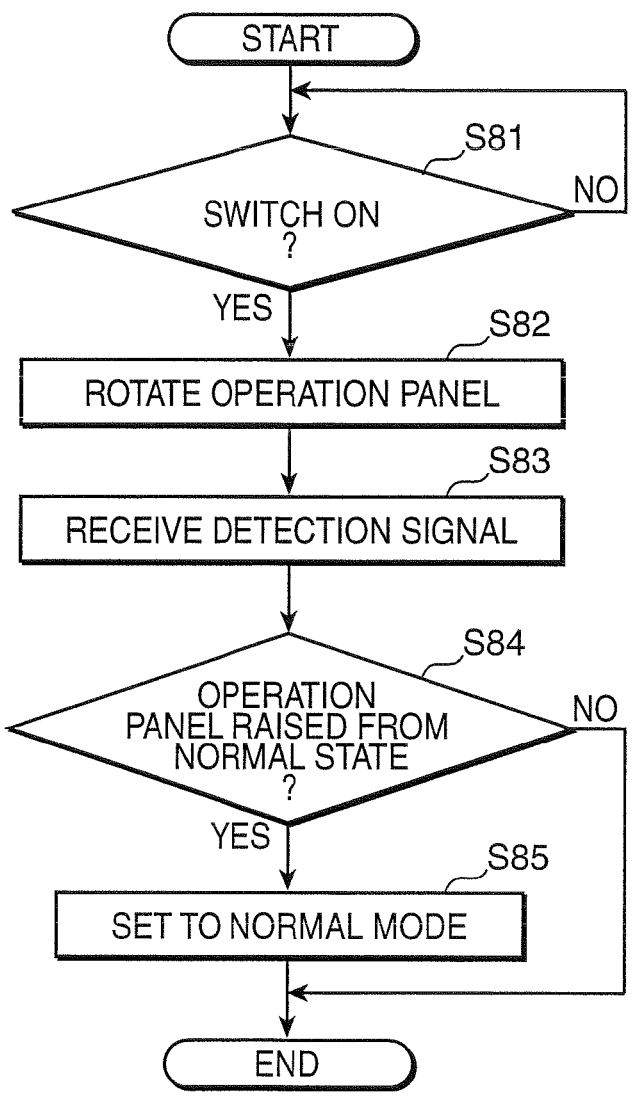
FIG. 28 is a flow chart showing the operation of the image forming apparatus of the sixth embodiment.

Next, the operation of the image forming apparatus 10*e* is described with reference to a flow chart shown in FIG. 28. First, when a switch S is turned on by a user in Step S81 (YES in Step S81), the controller 140*e* outputs a drive signal to the motor M to rotate the operation panel (Step S82). On the other hand, this routine returns to Step S81 as long as the switch S is not turned on by the user (NO in Step S81).

In Step S83, the controller 140*e* receives a detection signal outputted from an inclination angle detecting sensor 301. Here, the inclination angle detecting sensor 301 outputs an electrical signal of a level corresponding to the angle of inclination of the operation panel 18 to the controller 140*e* as a detection signal.

In Step S84, the controller 140*e* discriminates whether or not the operation panel 18 has been raised from the normal state in accordance with the detection signal outputted from the inclination angle detecting sensor 301. Here, the controller 140*e* judges that the operation panel 18 is in the raised state if the angle represented by the detection signal outputted by the inclination angle detecting sensor 301 is equal to or larger than a specified angle. Here, the specified angle is an angle predetermined to discriminate whether the operation panel 18 is in the raised state or in the normal state.

On the other hand, the controller 140*e* judges that the operation panel 18 is in the normal state if the angle of inclination represented by the detection signal outputted from the inclination angle detecting sensor 301 is below the specified angle.

The controller 140*e* resets the values set for the various items to the defaults (Step S85) if the discrimination result of Step S84 is positive while ending the routine if the discrimination result in Step S84 is negative.

As described above, according to the image forming apparatus 10*e* of the sixth embodiment, the values set for the various items are reset to the defaults if the operation panel 18 is rotated. Thus, copying errors can be reduced.

The inventive image forming apparatus comprises the operation display unit mounted on the apparatus main body such that the angle of inclination thereof to horizontal direction is adjustable and adapted to display various operation images; the detecting unit for detecting the angle of inclination of the operation display unit; and the support operation executing unit for executing the specified operation to support a physically handicapped operator when the detecting unit detects that the operation display unit has been adjusted from the initial state.

With this construction, the operation display unit is mounted on the apparatus main body such that the angle of inclination thereof to horizontal direction is adjustable. When the detecting unit detects that the operation display unit has been adjusted from the initial state, the specified support operation is executed to support the physically handicapped operator. In other words, operability for physically handicapped people can be improved because the support operation is executed only by the physically handicapped operator performing a simple operation of adjusting the angle of inclination of the operation display unit.

The support operation executing unit preferably extends the period up to the execution of the associated processing relating to the image formation or prohibits the execution of the associated processing if the detecting unit detects that the operation display unit has been adjusted from the initial state.

With this construction, the period up to the execution of the associated processing by the operation display unit is extended or the execution of the associated processing is prohibited if the position of the operation display unit is detected to have been adjusted from the initial state. Thus, the operable period of the operation display unit can be longer if the operation display unit has been adjusted than if the operation display unit is in the initial state without being adjusted.

Specifically, in the case of a physically handicapped operator in a wheel chair, he requires a longer time than physically normal people to operate the operation display unit because a distance to the operation display unit is inevitably longer. Thus, the associated processing is executed before the operation of the operation display unit is completed, thereby making it more likely to reset input values just set to initial values. However, with the above construction, such a situation can be avoided since the start of the execution of the associated processing is postponed or canceled if the angle of inclination of the operation display unit is adjusted.

In the above construction, the associated processing relating to the image formation is preferably the automatic clear processing for automatically resetting the input values relating to the image formation, which are values different from the initial values and entered to the operation display unit, to the initial values upon the lapse of a predetermined period after the entry operation.

With this construction, the period up to the start of the associated processing is extended or the associated processing is canceled if the angle of inclination of the operation display unit is adjusted. Thus, there can be avoided a situation where the input values just set are reset to the initial values before the operation of the operation display unit is completed.

The associated processing is preferably a power saving processing for setting a power saving state of reducing or shutting down the power supply to a specified mechanism installed in the image forming apparatus.

With this construction, the period up to the start of the power saving processing for reducing or shutting off the power supply to the specified mechanism installed in the image forming apparatus is extended or the power saving processing is canceled if the angle of inclination of the operation display unit is adjusted. Thus, there can be avoided a situation where the input values just set are reset to the initial values before the operation of the operation display unit is completed.

The inventive image forming apparatus further comprises the image forming assembly for forming an image on a recording sheet based on an image data and the fixing unit for fixing the image formed in the image forming assembly to the recording sheet, and the power saving processing is preferably a transition processing to the preheating mode for reducing the power supply to the fixing unit.

With this construction, there can be avoided a situation where the preheating mode is set before the operation of the operation display unit is completed, whereby the brightness of the operation image displayed on the operation display unit becomes darker to deteriorate the operability.

The power saving processing is preferably a transition processing to the sleep mode for reducing or shutting off the power supply to the specified mechanism including the operation display unit.

With this construction, there can be avoided a situation where the sleep mode is set before the operation of the operation display unit is completed, whereby the brightness of the operation image displayed on the operation display unit becomes darker to deteriorate the operability.

In the above construction, it is preferable that the detecting unit detects the first position where the operation display unit is at the specified angle to the horizontal plane and the second position where the operation display unit is at an angle larger to the horizontal plane than at the first position, and that the support operation executing unit executes the associated processing or cancels the execution of the associated processing upon the lapse of the second period longer than the first period, which is a period up to the execution of the associated processing when the operation display unit is at the first position, when the operation panel is at the second position, and executes the associated processing after resetting the period up to the execution of the associated processing to the first period if the operation display unit is returned from the second position to the first position.

With this construction, if the operation display unit is at the second position, the associated processing relating to the image formation is executed upon the lapse of the second period longer than the first period corresponding to the first position or the associated processing is not executed. Thus, there can be effectively avoided a situation where the associated processing relating to the image formation is executed before the entry to the operation display unit is completed, whereby the input values just set in the operation display unit are reset to the initial values to invalidate the entry. As a result, operability for wheel-chaired handicapped people can be improved.

Further, if the operation display unit is returned from the second position to the first position, the associated processing is executed after resetting the period up to the execution of the associated processing to the first period. Thus, no inconvenience is caused also when physically normal people operate the operation display unit. As a result, sufficient visibility and operability of the operation display unit can be ensured for both physically normal people and physically handicapped people.

In the above construction, it is preferable that the associated processing is the automatic clear processing and that the image forming apparatus further comprises the function mode selecting section for alternatively selecting the first function mode for executing the associated processing or canceling the execution of the associated processing upon the lapse of the second period when the operation display unit is at the second position and executing the associated processing after resetting the period up to the execution of the associated processing to the first period when the operation display unit is returned from the second position to the first position, and the second function mode for executing the associated processing upon the lapse of the first period even if the operation display unit is at the second position.

With this construction, since the first and second function modes can be alternatively selected, the second function mode can be selected if the operation panel is at the second position, but no inconvenience would be caused to physically handicapped people.

It is preferable that the operation display unit includes the drive source for selectively moving the operation display unit to the first position and to the second position, and that the image forming apparatus further comprises the drive source controlling section for controlling the drive source to return the operation display unit from the second position to the first position if no image forming operation has been started even though the predetermined period elapsed after the operation display unit was moved from the first position to the second position or if the predetermined period has elapsed after the image forming operation was completed, and the period setting section for changing the predetermined period up to the return of the operation display unit from the second position to the first position.

With this construction, the period up to the automatic return of the operation display unit to the first position can be changed if no image forming operation has been started even though the predetermined period elapsed after the operation display unit was moved from the first position to the second position or if the predetermined period has elapsed after the image forming operation was completed. Thus, it can be made possible to prohibit the automatic return to the first position before the entry to the operation display unit is completed.

The displayed state of the operation image is preferably changed to increase the visibility of the operation image to be displayed on the operation display unit when the detecting unit detects that the state of the operation display unit has been adjusted form the initial state.

With this construction, the displayed state of the operation image is changed to increase the visibility of the operation image to be displayed on the operation display unit when the angle of inclination of the operation display unit was adjusted. Thus, sufficient visibility and operability of the operation display unit can be ensured both for physically normal people who use the image forming apparatus with the angle of inclination of the operation display unit set to the initial state and for physically handicapped people who use the image forming apparatus with the angle of inclination of the operation display unit adjusted.

It is preferably that the detecting unit detects the angle of inclination of the operation display unit and the support operation executing unit causes the operation image to be displaced on the operation display unit while rotating the operation image according to the angle of inclination of the operation display unit.

With this construction, since the rotation angle of the operation image is increased as the angle of inclination of the operation display unit increases, the rotation angle of the operation image can be adjusted by adjusting the angle of inclination of the operation display unit. As a result, operability in operating the operation display unit while viewing the operation image sideways can be improved.

The support operation executing unit preferably increases the rotation angle of the operation image as the angle of inclination increases.

Since the rotation angle of the operation image is increased as the angle of inclination of the operation display unit increases, the rotation angle of the operation image can be adjusted by adjusting the angle of inclination of the operation image. As a result, operability in operating the operation display unit while viewing the operation image sideways can be improved.

The support operation executing unit preferably prohibits the operation image from being rotated until the angle of inclination reaches the predetermined value or larger.

With this construction, since the operation image to be displayed is not rotated unless the operation display unit is inclined by the predetermined angle or more, the operability of the user wishing to operate the operation image while slightly inclining the operation display unit from the front side of the image forming apparatus can be improved.

The support operation executing unit preferably displays the operation image while rotating a partial image of the operation image.

With this construction, since only the partial image of the operation image is displayed while being rotated, a situation where the operation image partly comes out of a display area if being entirely rotated can be prevented and operability can be improved.

It is preferable that the partial image is operation buttons having round contours and the support operation executing unit displays the operation buttons while rotating the operation buttons about the centers thereof.

With this construction, since only the operation buttons in circles are displayed while being rotated, this can prevent the operation image from being displayed while being left out.

In the above construction, the image forming apparatus further comprises the mode setting section for setting either the mode for rotating the operation image according to the angle of inclination or the mode for prohibiting the rotation of the operation image according to the angle of inclination in accordance with an operation command from the user.

With this construction, since the mode for rotating the operation image according to the angle of inclination and the mode for prohibiting the rotation of the operation image according to the angle of inclination can be alternatively set, the needs of the user not wishing to rotate the operation image at all can be flexibly met.

In the above construction, it is preferable that the detecting unit detects the first position where the operation display unit is at the specified angle to the horizontal plane and the second position where the operation display unit is at an angle larger to the horizontal plane than at the first position, and that the support operation executing unit sets a higher visibility of the operation image when the operation display unit is at the second position than when the operation display unit is at the first position.

With this construction, the displayed state of the operation image is changed to set the higher visibility of the operation image to be displayed on the operation display unit when the operation display unit is at the second position than when the operation display unit is at the first position. Thus, sufficient visibility and operability of the operation display unit can be ensured both for physically normal people who use the image forming apparatus with the operation display unit set at the first position and for physically handicapped people who use the image forming apparatus with the operation display unit set at the second position.

In the above construction, the support operation executing unit preferably enlarges the operation image to be displayed larger on the operation display unit when the operation display unit is at the second position than when the operation display unit is at the first position.

With this construction, since the operation image is enlarged to be displayed larger on the operation display unit when the operation display unit is at the second position than when the operation display unit is at the first position, the visibility of the operation image can be improved for physically handicapped people who are inevitably at a longer distance from the operation display unit. As a result, sufficient visibility and operability of the operation display unit can be ensured both for physically normal people who use the image forming apparatus with the operation display unit set at the second position and for physically handicapped people who use the image forming apparatus with the operation display unit set at the first position.

It is preferable that the image forming apparatus further comprises the mode selecting section for alternatively selecting the first display mode for changing the displayed state of the operation image on the operation display unit when the operation display unit is at the second position and the second display mode for not changing the displayed state of the operation image on the operation display unit even when the operation display unit is at the second position, and that the support operation executing unit enlarges the operation image to be displayed larger on the operation display unit when the operation display unit is at the second position than when the operation display unit is at the first position if the first display mode is selected.

With this construction, the first display mode for changing the displayed state of the operation image and the second display mode for not changing the displayed state of the operation image can be alternatively selected.

It is preferable that the image forming apparatus further comprises the rotating device for rotating the operation display unit by changing the angle of inclination of the operation display unit to horizontal direction, and the support operation executing unit switches the operation mode either to the normal operation mode or to the power saving mode and switches the operation mode to the normal operation mode when the operation display unit is rotated by the rotating device from the first state where the operation surface of the operation display unit horizontally lies to the second state where the operation surface is at a larger angle of inclination than in the first state with the operation mode set to the power saving mode.

With this construction, if the operation display unit is rotated by the rotating device with the power saving mode set, the operation mode is reset to the normal operation mode. Accordingly, the user can reset the operation mode to the normal operation mode without performing any cumbersome operation using the operation display unit. As a result, operability for physically handicapped people can be improved.

In the above construction, the rotating device preferably includes the motor and rotates the operation display unit by the torque of the motor.

With this construction, since the operation display unit is rotated by the torque of the motor, the operation display unit can be easily rotated even if the user is feeble. Particularly, operability for users who operate in wheelchairs can be improved.

In the above construction, the rotating device preferably rotates the operation display unit by a force exerted on the operation display unit from the user.

With this construction, the construction of the apparatus can be simplified since the operation display unit is manually rotated.

It is preferable that the image forming apparatus further comprises the rotating device for rotating the operation display unit by changing the angle of inclination of the operation display unit to horizontal direction and the support operation executing unit registers values set by the user for various items and resets the registered set values to the defaults for the respective items when the operation display unit is rotated by the rotating device from the first state where the operation surface of the operation display unit horizontally lies to the second state where the operation surface is at a larger angle of inclination than in the first state in accordance with the operation commands received by the operation display unit.

With this construction, when the state of the operation display unit is changed from the first state where the operation surface of the operation display unit horizontally lies to the second state where the operation surface is at a larger angle of inclination than in the first state, the values registered for various items are reset to the defaults. Thus, there can be prevented a copying error that occurs when a certain user sets values different from the defaults for various items and another user starts a copying operation immediately thereafter while taking it for granted that the defaults are set for the respective items. Particularly, an occurrence of the above copying error to wheel-chaired handicapped people who have difficulty in visually confirming the operation display unit due to their low lines of vision can be effectively prevented.

In the above construction, the support operation executing unit preferably includes the mode setting section for setting either the mode for resetting the values registered for the respective items to the defaults when the operation display unit is rotated from the first state to the second state or the mode for keeping the set values registered for the respective items as they are when the operation display unit is rotated from the first state to the second state in accordance with the operation command from the user.

With this construction, the needs of the user can be flexibly met since the user can select the mode for resetting the values set for the respective items to the defaults or the mode for not resetting them to the defaults when the operation display unit is rotated from the first state to the second state.

In the above construction, the rotating device preferably includes the motor and rotates the operation display unit by the torque of the motor.

With this construction, since the operation display unit is rotated by the torque of the motor, the operation display unit can be easily rotated even if the user is feeble. Particularly, operability for users who operate in wheelchairs can be improved.

In the construction, the switch for turning the motor on in accordance with the operation by the user is preferably arranged below and in the vicinity of the operation display unit.

With this construction, since the switch for rotating the operation display unit is arranged below and in the vicinity of the operation display unit, operability for wheel-chaired users having lower lines of vision can be improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

This application is based on patent application Nos. 2005-023522, 2005-024210, 2005-024475, 2005-065508, 2005-065676 and 2005-065739 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image forming apparatus, comprising:
    an operation display unit mounted on an apparatus main body such that an angle of inclination thereof to horizontal direction is adjustable and adapted to display various operation images,
    a detecting unit for detecting the angle of inclination of the operation display unit, and
    an operation executing unit for executing an associated processing relating to an image formation when the detecting unit detects that the state of the operation display unit has been adjusted from an initial state,
    wherein the operation executing unit changes the displayed state of the operation image to increase the visibility of the operation image to be displayed on the operation display unit when the detecting unit detects that the state of the operation display unit has been changed from the initial state and prohibits the operation image from being rotated until the angle of inclination reaches a predetermined value or larger, and
    the detecting unit detects the angle of inclination of the operation display unit, and the operation executing unit causes the operation display unit, and the operation executing unit causes the operation image to be displayed on the operation display unit while rotating the operation image according to the angle of inclination of the operation display unit.

2. An image forming apparatus according to claim 1, wherein the operation executing unit increases the rotation angle of the operation image as the angle of inclination increases.

3. An image forming apparatus, comprising:
    an operation display unit mounted on an apparatus main body such that an angle of inclination thereof to horizontal direction is adjustable and adapted to display various operation images,
    a detecting unit for detecting the angle of inclination of the operation display unit, and
    an operation executing unit for executing an associated processing relating to an image formation when the detecting unit detects that the state of the operation display unit has been adjusted from an initial state,
    wherein the operation executing unit changes the displayed state of the operation image to increase the visibility of the operation image to be displayed on the operation display unit when the detecting unit detects that the state of the operation display unit has been changed from the initial state and displays the operation image while rotating a partial image of the operation image, and
    the detecting unit detects the angle of inclination of the operation display unit, and the operation executing unit causes the operation display unit, and the operation executing unit causes the operation image to be displayed on the operation display unit while rotating the operation image according to the angle of inclination of the operation display unit.

4. An image forming apparatus according to claim 3, wherein the partial image includes operation buttons having round contours, and the operation executing unit displays the operation buttons while rotating the operation buttons about the centers thereof.

5. An image forming apparatus according to claim 1, further comprising a mode setting section for setting either a mode for rotating the operation image according to the angle of inclination or a mode for prohibiting the operation image from being rotated according to the angle of inclination in accordance with an operation command from the user.

* * * * *